US011180264B2

(12) United States Patent
Best et al.

(10) Patent No.: US 11,180,264 B2
(45) Date of Patent: Nov. 23, 2021

(54) APPARATUS AND METHOD FOR MOVING A STRUCTURE IN A MANUFACTURING ENVIRONMENT

(71) Applicant: The Boeing Company, Chicago, IL (US)

(72) Inventors: Steven Best, Marysville, WA (US); Eric Reid, Kenmore, WA (US); James N. Buttrick, Seattle, WA (US); Daniel M. McDonagh, Seattle, WA (US); Matthew DesJardien, Kenmore, WA (US)

(73) Assignee: The Boeing Company, Chicago, IL (US)

(*) Notice: Subject to any disclaimer, the term of this patent is extended or adjusted under 35 U.S.C. 154(b) by 710 days.

(21) Appl. No.: 15/660,068

(22) Filed: Jul. 26, 2017

(65) Prior Publication Data

US 2017/0327246 A1 Nov. 16, 2017

Related U.S. Application Data

(62) Division of application No. 13/940,843, filed on Jul. 12, 2013, now Pat. No. 9,745,081.

(51) Int. Cl.
*B64F 5/10* (2017.01)
*B64F 5/50* (2017.01)
(Continued)

(52) U.S. Cl.
CPC .............. *B64F 5/10* (2017.01); *B64F 5/50* (2017.01); *F16M 11/42* (2013.01);
(Continued)

(58) Field of Classification Search
CPC .. B64F 5/10; B64F 5/50; F16M 11/42; G01M 5/0016; G01M 5/0058; G01M 17/0072;
(Continued)

(56) References Cited

U.S. PATENT DOCUMENTS 3,850,307 A * 11/1974 Motoda ................ B66C 23/005
212/237
4,132,318 A * 1/1979 Wang ..................... B25J 13/082
294/86.4
(Continued)

FOREIGN PATENT DOCUMENTS

EP 2604524 A2 6/2013
JP 2013-123794 6/2013

OTHER PUBLICATIONS

Innovation, Science and Economic Development Canada, Official Action, 2,948,813 (dated Jan. 17, 2018).
(Continued)

*Primary Examiner* — Mahdi H Nejad
(74) *Attorney, Agent, or Firm* — Walters & Wasylyna LLC

(57) ABSTRACT

A mobile fixture configured to move a structure in a manufacturing environment may include a motorized base configured to move on a surface and a support system connected to the motorized base, the support system being configured to support the structure, the support system being configured to position the structure along at least one of an X-axis, a Y-axis, and a Z-axis, the support system being configured to position the structure about the Z-axis, and the support system being configured to provide free rotation of the structure about at least one of the X-axis and the Y-axis.

20 Claims, 13 Drawing Sheets

(51) Int. Cl.
  *G01M 5/00*    (2006.01)
  *G01M 17/007*  (2006.01)
  *F16M 11/42*   (2006.01)
  *B25J 9/16*    (2006.01)

(52) U.S. Cl.
  CPC ........ *G01M 5/0016* (2013.01); *G01M 5/0058* (2013.01); *G01M 17/007* (2013.01); *G01M 17/0072* (2013.01); *G01M 17/0074* (2013.01); *G01M 17/0078* (2013.01); *B23P 2700/01* (2013.01); *B25J 9/1682* (2013.01); *Y10T 29/49622* (2015.01)

(58) Field of Classification Search
  CPC ........... G01M 17/007; G01M 17/0074; G01M 17/0078; Y10T 29/49622; B23Q 1/035; B23P 2700/01
  See application file for complete search history.

(56) References Cited

U.S. PATENT DOCUMENTS

| | | | |
|---|---|---|---|
| 4,765,011 A | | 8/1988 | Leeper |
| 5,105,069 A | | 4/1992 | Hakenewerth et al. |
| 5,163,793 A | * | 11/1992 | Martinez .................. B21J 15/10 269/309 |
| 7,156,865 B2 | * | 1/2007 | Waldmann ............. A61N 5/062 607/88 |
| 7,319,738 B2 | * | 1/2008 | Lasiuk .................... G01N 23/04 378/198 |
| 8,661,684 B1 | * | 3/2014 | Boyd ..................... B21D 53/92 29/407.1 |
| 9,266,624 B2 | * | 2/2016 | Valenzuela ............. B66F 9/063 |
| 9,745,081 B2 | * | 8/2017 | Best ........................ F16M 11/42 |
| 10,427,254 B2 | * | 10/2019 | Day .......................... B64F 5/10 |
| 10,782,696 B2 | * | 9/2020 | Vance .................... B25J 13/085 |
| 2005/0015962 A1 | * | 1/2005 | Sturm, Jr. ............... B23Q 1/035 29/468 |
| 2007/0036627 A1 | * | 2/2007 | Wright ..................... B64F 5/50 410/49 |
| 2008/0054541 A1 | * | 3/2008 | Dixon ....................... B23Q 1/32 269/75 |
| 2008/0205763 A1 | * | 8/2008 | Marsh ..................... B64F 5/10 382/190 |
| 2011/0054694 A1 | * | 3/2011 | Munk ..................... B25B 11/02 700/275 |
| 2011/0302784 A1 | * | 12/2011 | Yamane ................... B64F 5/10 29/897.2 |
| 2012/0110816 A1 | * | 5/2012 | Groves .................... B62B 3/10 29/428 |
| 2013/0158697 A1 | * | 6/2013 | Stone .................... B25J 9/1682 700/114 |
| 2013/0310982 A1 | * | 11/2013 | Scheurer ............... B25J 9/1664 700/263 |
| 2014/0157588 A1 | * | 6/2014 | Boyd ....................... B64F 5/10 29/703 |
| 2014/0314538 A1 | * | 10/2014 | Carter .................... A61B 90/50 414/744.3 |
| 2014/0353894 A1 | * | 12/2014 | DesJardien ............ B23Q 1/037 269/21 |
| 2015/0298824 A1 | * | 10/2015 | Larson .................... B64F 5/10 29/559 |
| 2015/0314891 A1 | * | 11/2015 | Cobb ....................... B64F 5/10 700/97 |
| 2015/0314892 A1 | * | 11/2015 | DesJardien ............. B64F 5/10 29/559 |
| 2015/0344154 A1 | * | 12/2015 | Larson ................... B23Q 1/035 29/559 |
| 2016/0009421 A1 | * | 1/2016 | Oberoi .................... B21J 15/28 269/17 |
| 2016/0185467 A1 | * | 6/2016 | Lim ......................... B64F 5/10 29/714 |
| 2016/0325853 A1 | * | 11/2016 | Stone ....................... B64F 5/40 |
| 2017/0157725 A1 | * | 6/2017 | Stone ....................... B64F 5/10 |
| 2017/0253167 A1 | * | 9/2017 | Gill, III ................... B60P 3/00 |
| 2019/0314940 A1 | * | 10/2019 | Kirby ..................... B28B 7/025 |
| 2020/0223020 A1 | * | 7/2020 | Oberst .................... B23P 19/10 |

OTHER PUBLICATIONS

State Intellectual Property Office, Official Action, CN 201410324656.9 (dated Nov. 1, 2017).

Canadian Intellectual Property Office, "Examination Search Report," App. No. 2,948,813 (dated Aug. 22, 2018).

Japanese Patent Office, Official Action, JP 2014-141114 (dated May 15, 2018).

The Korean Intellectual Property Office, Office Action, with English translation, App. No. 10-2014-0074768 (dated Apr. 27, 2020).

National Institute of Industrial Property (Brazil), Office Action, with English translation, App. No. BR102014017222 (dated Mar. 29, 2020).

* cited by examiner

APPARATUS AND METHOD FOR MOVING A STRUCTURE IN A MANUFACTURING ENVIRONMENT

PRIORITY

This application is a divisional of U.S. Ser. No. 13/940,843 filed on Jul. 12, 2013.

FIELD

The present disclosure is generally related to manufacturing structures and, more particularly, to an apparatus and method for moving a structure in a manufacturing environment using a plurality of mobile fixtures that specifically restrain movement of the structure in certain directions and specifically allow movement of the structure in certain directions.

BACKGROUND

With currently available assembly lines, transportation of the components used to manufacture structures, such as an aircraft, may be more difficult than desired. For example, a wing for an aircraft may have a wedge shape. In other words, the wing may be wide at an inboard end of the wing and narrow at an outboard end of the wing. This type of shape may make manufacturing the wing more difficult and time-consuming than desired.

Some currently available methods for manufacturing a wing, as well as other types of structures, may use a fixed assembly system or jig. A fixed assembly system may use a number of stationary support fixtures to support a wing box and/or other parts for the wing at different positions or stations along an assembly line and may use a separate transportation system to transport the wing box and/or other parts for the wing to the different stations along the assembly line.

Additionally, the performance of a wing may be reduced if the location and/or orientation of the wing during manufacturing moves beyond selected tolerances at and/or between any stations along an assembly line. In some cases, the interchangeability of parts on a wing may be reduced when the wing is not supported in a desired orientation within selected tolerances while being transported and/or during manufacturing.

Accordingly, those skilled in the art continue with research and development efforts directed to moving structures, such as an aircraft wing, in a manufacturing environment.

SUMMARY

In one embodiment, the disclosed mobile fixture may include a mobile base configured to move on a surface, a connector system connected to the base, the connector system being configured to support a structure, wherein the connector system is configured to provide free movement of the structure relative to the base about an X-axis and a Y-axis.

In another embodiment, the disclosed mobile fixture may include a motorized base configured to move on a surface and a support system connected to the base, the support system being configured to support a structure, wherein the support system is configured to position the structure at a desired orientation along at least one of an X-axis, a Y-axis, and a Z-axis, wherein the support system is configured to position the structure at the desired orientation about the Z-axis, and wherein the support system is configured to provide free rotation of the structure about at least one of the X-axis and the Y-axis.

In another embodiment, also disclosed is a method for manufacturing a structure, the method may include the steps of: (1) supporting a structure on a plurality of mobile fixtures, each mobile fixture of the plurality of mobile fixtures being configured to control a desired orientation of the structure, (2) moving the plurality of fixtures along a surface, (3) adjusting an orientation of the structure in order to relieve induced stresses upon the structure due to mismatches in parallelism between adjacent mobile fixtures of the plurality of mobile fixtures, and (4) performing an operation on the structure.

In yet another embodiment, also disclosed is a method for transporting a structure, the method includes the steps of: (1) supporting the structure on mobile fixtures, (2) controlling, by at least one of the mobile fixtures, a position of the structure along at least one of an X-axis, a Y-axis, and a Z-axis relative to the at least one of the mobile fixtures, (3) moving the mobile fixtures along a surface, and (4) reacting to an external force acting upon the at least one of the mobile fixtures by the structure.

Other embodiments of the disclosed apparatus and method for moving a structure in a manufacturing environment will become apparent from the following detailed description, the accompanying drawings and the appended claims.

DETAILED DESCRIPTION

Figure 1:
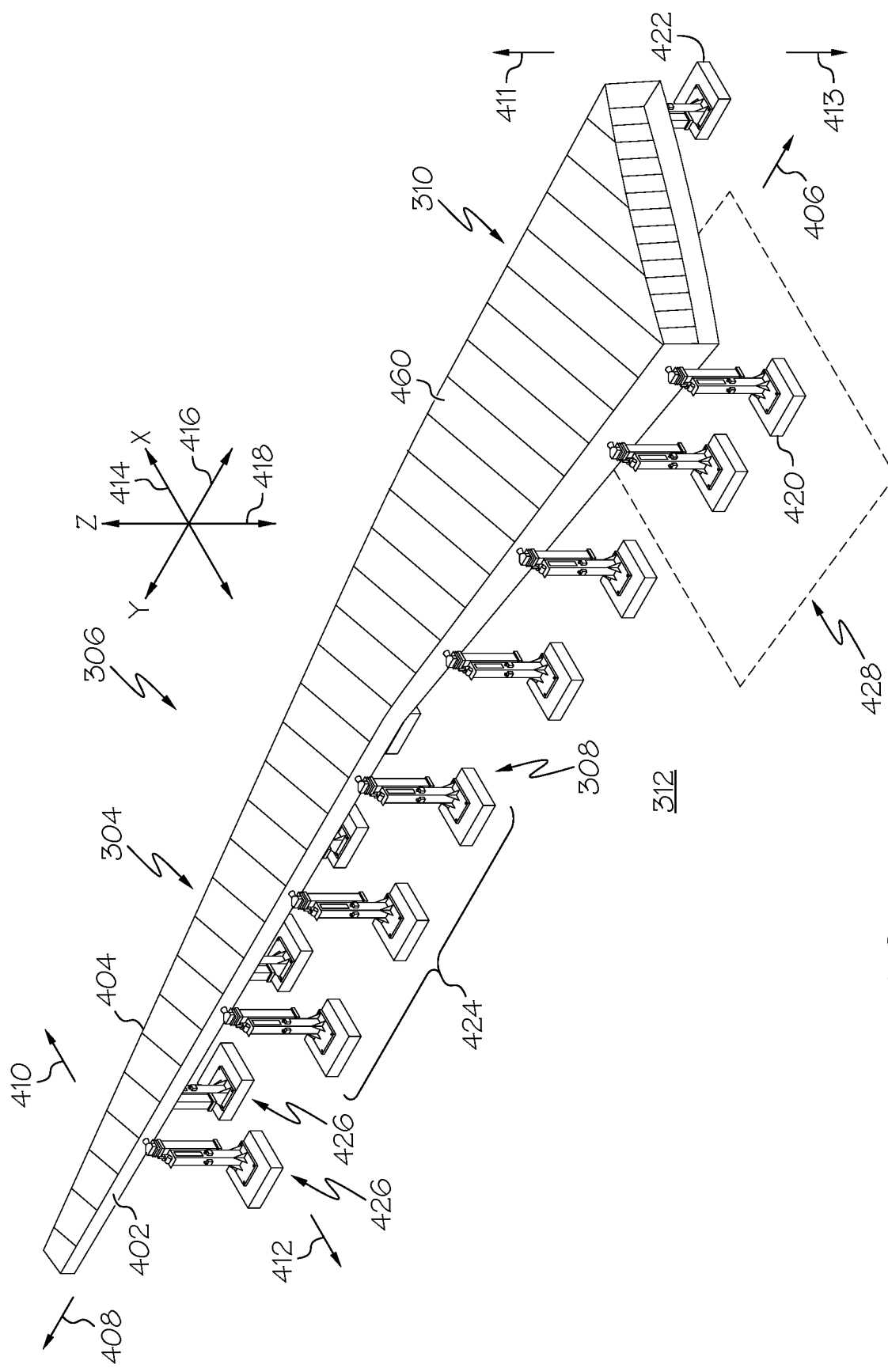
FIG. 1 is a perspective view of an embodiment of the disclosed carrier system.

The following detailed description refers to the accompanying drawings, which illustrate example embodiments of the disclosure. Other embodiments having different structures and operations do not depart from the scope of the present disclosure. Like reference numerals may refer to the same element or component in the different drawings.

Figure 14:
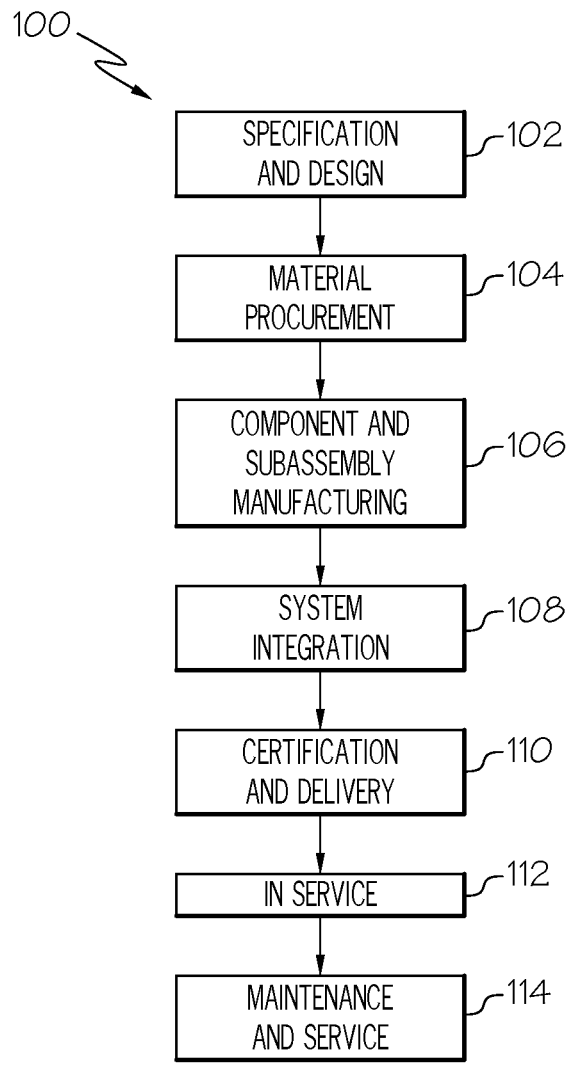
FIG. 14 is a flow diagram of an embodiment of an aircraft production and service methodology.
Figure 15:
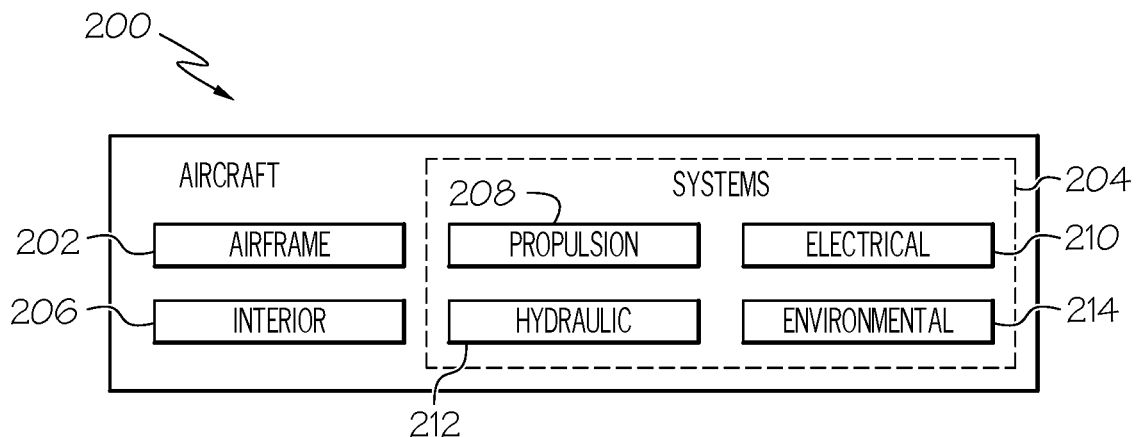
FIG. 15 is a block diagram of an embodiment of an aircraft.

Referring more particularly to the drawings, embodiments of the disclosure may be described in the context of a component, structure, part, or machine manufacturing and servicing method as shown in FIG. 14 and of a component, structure, part or machine as shown in FIG. 15.

Referring to FIG. 14, disclosed is an embodiment of an aircraft manufacturing and service method, generally designated 100. During pre-production, the exemplary method 100 may include specification and design 102 of an aircraft 200 and material procurement 104. During production, component and subassembly manufacturing 106 and system integration 108 of the aircraft 200 takes place. Thereafter, the aircraft 200 may go through certification and delivery 110 in order to be placed in service 112. While in service by a customer, the aircraft 200 is scheduled for routine maintenance and service 114 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Referring to FIG. 15, the aircraft 200 produced by the example method 100 (FIG. 14) may include an airframe 202 with a plurality of systems 204 and an interior 206. Examples of high-level systems 204 include one or more of a propulsion system 208, an electrical system 210, a hydraulic system 212, and an environmental system 214. Any number of other systems may be included. Although an aerospace example is shown, the principles of the present disclosure may be applied to other industries, such as the automotive industry, marine industry, locomotive industry, machine industry, and the like, without limitation.

The apparatus and method embodied herein may be employed during any one or more of the stages of the production and service method 100 (FIG. 14). For example, components or subassemblies corresponding to manufacturing process 106 may be fabricated, manufactured, or produced in a manner similar to components or subassemblies produced while the aircraft 200 is in service 112 (FIG. 14). Also, one or more apparatus embodiments, method embodiments, or a combination thereof may be utilized during the production stages, such as component and subassembly manufacturing 106 and system integration 108. Similarly, one or more of apparatus embodiments, method embodiments, or a combination thereof may be utilized while the aircraft 200 is in service 112, for example and without limitation, to maintenance and service 114 (FIG. 14).

In particular, different structures manufactured and assembled during one or more stages of aircraft manufacturing and service method 100 (FIG. 14) may be performed using one or more illustrative embodiments to move the structure. In particular, one or more example embodiments may reduce the amount of time needed to move structures to different locations. The use of a number of the different example embodiments may substantially expedite the assembly of and/or reduce the cost of aircraft 200 (FIG. 15).

The different example embodiments recognize and take into account that when a structure is manufactured, the structure may be positioned in a desired orientation. This desired orientation may be substantially maintained during manufacturing of the structure using one or more example embodiments. By maintaining the desired orientation, the structure may be manufactured within desired tolerances. As a result, a desired amount of performance or level of maintenance may be achieved.

Further, the different example embodiments also recognize and take into account that if a wing is manufactured at a station and the orientation changes beyond some desired amount, the different features of the wing may not have the desired tolerances. When one or more features of a wing are out of tolerance, the performance and/or maintenance of the wing may be affected.

The different example embodiments recognize and take into account that reducing the time needed to perform different operations on a wing at different stations may reduce the amount of time needed to manufacture the wing. For example, avoiding using a crane or other lifting mechanism to move a structure from a fixed fixture to a platform for transport to another station may be desirable.

The different example embodiments recognize and take into account that with the size of aircraft structures and the desired tolerances of these structures, movement of tools on wheels or rails may be impractical or expensive. Further, the different illustrative embodiments recognize and take into account that as the size of the aircraft structure increases, the size of the platform used to move the aircraft structure down an assembly line necessarily also increases.

Thus, maintaining the aircraft structure in a desired orientation as the aircraft structure is moved down an assembly line may depend on the use of platforms that increase in size as the aircraft structure increases in size. These platforms may be constructed with a size and stiffness selected to maintain the aircraft structure in a desired orientation.

The different example embodiments recognize and take into account that although this type of platform may maintain the aircraft structure in the desired orientation, these platforms may have a greater size and expense than desired. Further, the different illustrative embodiments recognize and take into account that the size of the platform may be impractical with the location of tools used to perform operations on the structure.

Thus, the different example embodiments provide a method and apparatus for manufacturing structures. In one example embodiment, an apparatus may include a motorized base, a support system, and a controller. The motorized base may be configured to move on a surface. The support system may be associated with the motorized base. The support system may be configured to be positioned to support a portion of the structure. The controller may be associated with the motorized base. The controller may be configured to control movement of the motorized base.

These components may form a mobile fixture. A plurality of mobile fixtures may be connected to the structure and/or a part for use in manufacturing the structure. The structure and/or part may be moved from one station to another station, through an assembly line, and/or some other manufacturing setup.

In an example embodiment, a method for manufacturing a structure may be present. A part for the structure may be supported on a plurality of mobile fixtures configured to control an orientation of the part. The part for the structure may be moved using the plurality of mobile fixtures to a number of stations for performing a number of operations for manufacturing the structure using the part. The plurality of mobile fixtures may be configured to move in a coordinated manner and substantially maintain a desired orientation for the part while moving the part to a station in the number of stations. The number of operations for manufacturing the structure may be performed at the number of stations while the plurality of mobile fixtures supports the part.

Figure 2:
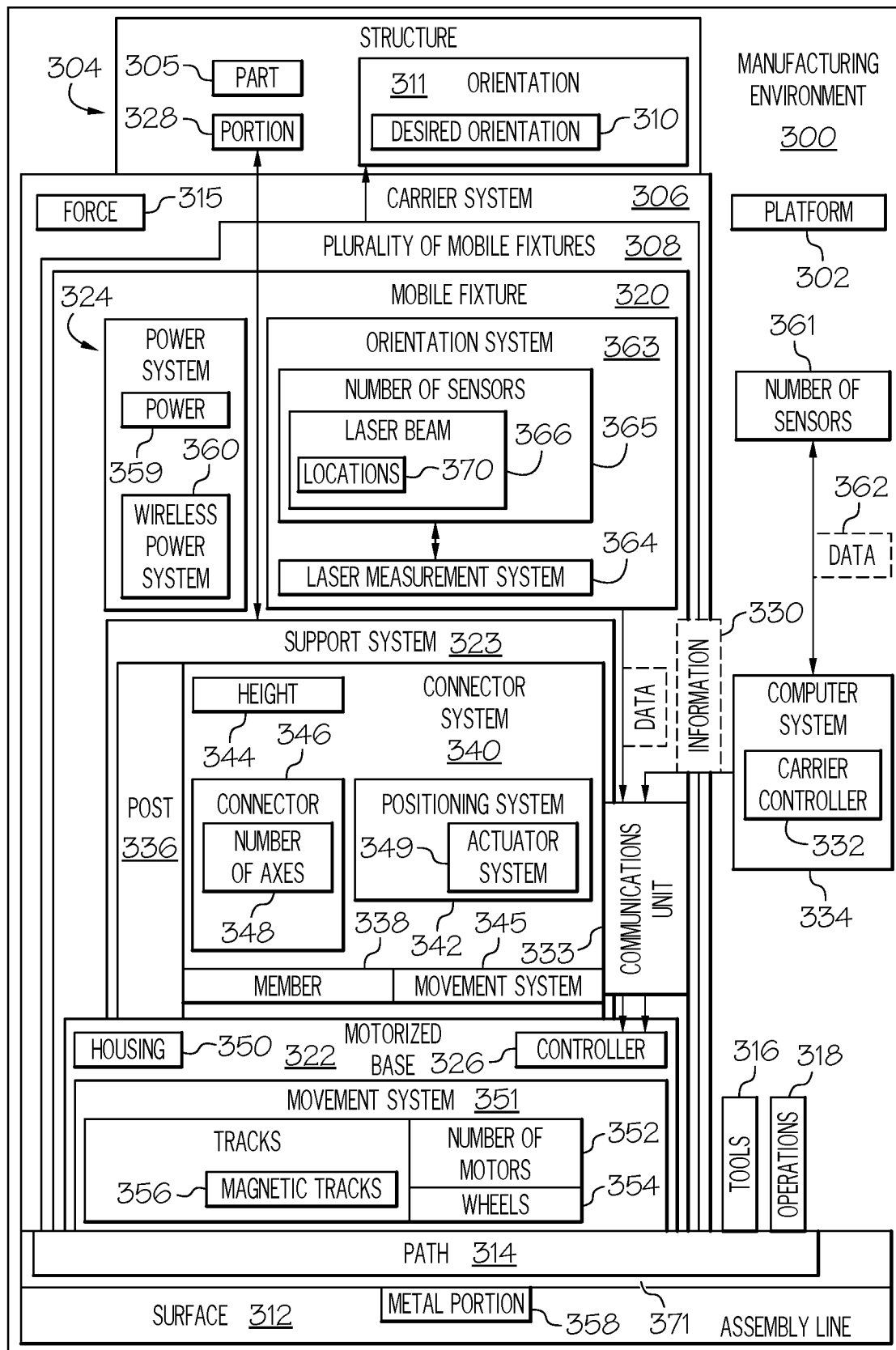
FIG. 2 is block diagram of an embodiment of the disclosed manufacturing environment.

Referring to FIG. 2, an embodiment of a manufacturing environment, generally designated 300, may be employed to manufacture a platform 302. As a particular example, the manufacturing environment 300 may be used to manufacture a structure 304 for the platform 302.

As a specific, non-limiting example, the platform 302 may be the aircraft 200 (FIG. 15). The structure 304 may be, for example and without limitation, an aerospace structure, such as a wing, a fuselage, a horizontal stabilizer, a vertical stabilizer, a flight control surface, an engine, or some other suitable type of structure for the platform 302. In some cases, the structure 304 may be the airframe 202, one of the plurality of systems 204, or the interior 206 of the aircraft 200 (FIG. 15). The structure 304 may also be a subassembly for another discrete structure.

The structure 304 may be manufactured using a carrier system 306. In an example implementation, the carrier system 306 may include a plurality of mobile fixtures 308. The plurality of mobile fixtures 308 may be configured to move in a coordinated manner (e.g., the plurality of mobile fixtures 308 may move as a group to move the structure 304 and/or parts used to manufacture the structure 304).

The plurality of mobile fixtures 308 may be configured to control orientation 311 of the structure 304 and/or parts used to manufacture the structure 304 during manufacturing of the structure 304. In particular, the plurality of mobile fixtures 308 may control the orientation 311 of the structure 304 such that a desired orientation 310 for the structure 304 may be substantially maintained.

The manufacturing of the structure 304 may involve a number of different operations. For example, the operations may include positioning parts, drilling holes, installing fasteners, finishing surfaces, painting surfaces, assembly operations, fabrication operations, and other suitable operations in addition to or in place of the ones listed, without limitation.

The plurality of mobile fixtures 308 of the carrier system 306 may move the structure 304 over a surface 312 in the manufacturing environment 300. Movement of the plurality of mobile fixtures 308 may be along a path 314 in the manufacturing environment 300. The plurality of mobile fixtures 308 disposed along the path 314 may move the structure 304 by applying a force 315 to the structure 304. The force 315 may be applied to the structure 304 by some or all of the plurality of mobile fixtures 308.

Tools 316 may be located on the path 314 and/or in areas surrounding or near the path 314. The tools 316 may perform operations to assemble the structure 304 while the structure 304 is in the desired orientation 310 on the plurality of mobile fixtures 308. For example, without limitation, plurality of mobile fixtures 308 may move structure 304 to a particular position along path 314. A portion of tools 316 then may be moved to this particular position along path 314 to perform operations on structure 304. In another example, plurality of mobile fixtures 308 may move structure 304 to a position along path 314 at which tools 316 are located such that tools 316 may perform operations on structure 304.

Additionally, operators 318 also may be present in the manufacturing environment 300. The operators 318 may perform operations to assemble the structure 304 when the structure 304 is positioned along the path 314 by the plurality of mobile fixtures 308. The operators 318 may be human operators or may be robotic operators, robotic machines, or some other type of automated machine configured to perform operations to assemble the structure 304.

Each mobile fixture 320 of the plurality of mobile fixtures 308 may include a mobile (e.g., motorized) base 322, a support system 323, a power system 324, and a controller 326. The motorized base 322 may be configured to move on the surface 312. The motorized base 322 may move without the need for operators 318 or some other external source to move the motorized base 322.

The support system 323 may be configured to support at least a portion 328 of the structure 304. As a particular, non-limiting example, the support system 323 may be configured to hold the portion 328 of the structure 304 or a part 305 of the structure 304 in the desired orientation 310. The controller 326 may be configured to control operation of the mobile fixture 320. For example, the controller 326 may control movement of the motorized base 322 on the surface 312 to follow the path 314. As another example, the controller 326 may control the support system 323 to position the portion 328 of the structure 304 in the desired orientation 310.

The controller 326 of the mobile fixture 320 may receive information 330 from a carrier controller 332 through a communications unit 333. The communications unit 333 may include at least one of a wireless communication unit, a wired communications unit, an optical communications unit, or some other suitable type of communications unit, without limitation. As depicted, information 330 may include commands, software, data, and other suitable types of information. The carrier controller 332 may be implemented using hardware, software, or a combination of hardware and software.

The carrier controller 332 may be implemented within a computer system 334. The computer system 334 may be one or more computers. When more than one computer is present in the computer system 334, the computers may be in communication with each other. This communication may be performed using any suitable medium, such as a network.

Information 330 may be used to direct movement of the plurality of mobile fixtures 308 in the carrier system 306. For example, information 330 may be used to cause the plurality of mobile fixtures 308 to move along the path 314. Additionally, information 330 may be used to control the orientation 311 of the structure 304.

Referring still to FIG. 2, the support system 323 of the mobile fixture 320 may include a post 336, a support member 338, a connector system 340, and a positioning system 342. In an example construction, the post 336 may extend from the motorized base 322. The connector system 340 may be configured to be connected to structure 304. In particular, connector system 340 may be configured to be connected to at least a portion 328 of the structure 304.

The support member 338 may be moveably connected to the post 336. Further, the member 338 may be connected to the connector system 340. In an example construction, movement of the member 338 may move the connector system 340 relative to at least one of the motorized base 322 and the post 336. For example, movement of the member 338 may change the height 344 of the connector system 340 relative to the motorized base 322.

A movement system 345 may be configured to move the support member 338 relative to the post 336. The movement system 345 may take a number of different forms. For example, the movement system 345 may be implemented using at least one of a screw jack, an actuator, an electric actuator, a gear system, and other suitable types of movement systems.

As depicted in FIG. 2, the connector system 340 may include a connector 346 and the positioning system 342. The connector 346 may be configured to be connected to at least a portion 328 of the structure 304. The positioning system 342 may be configured to position the connector 346 about a number of axes 348. In some example implementations, the positioning system 342 may be operated by operators 318, an actuator system 349, or a combination of the two. In another example implementation, the positioning system 342 may be an automated positioning system.

The motorized base 322 may include a housing 350 and a movement system 351. As depicted, the movement system 351 may include a number of motors 352, tracks 353, wheels 354, and other suitable components.

The housing 350 may be associated with other components of the mobile fixture 320. For example and without limitation, the support system 323 and the controller 326 may be associated with the housing 350. The tracks 353 and/or the wheels 354 may be configured to move the motorized base 322 on the surface 312 in conjunction with the number of motors 352 (e.g., the number of motors 352 may operate to cause the tracks 353 and/or the wheels 354 to move).

In another example implementation, the mobile base 322 may be moved (e.g., pushed or pulled) by one or more operators 318. The wheels 354 and/or tracks 353 may be freely moveable without the need to motors 352 or a controller 326.

The power system 324 may be configured to provide power 359 to the mobile fixture 320. For example, power 359 may be used to operate the number of motors 352, the controller 326, the movement system 351, and other suitable components of the mobile fixture 320. In an example implementation, the power system 324 may be a wireless power system 360. The wireless power system 360 may be at least one of a battery system, an inductive power system, a laser power system, and some other suitable type of wireless power system. In other illustrative examples, the power system 324 may be a wired power system.

A number of sensors 361 may be present within the manufacturing environment 300. The number of sensors 361 may generate data 362 about at least one of the carrier system 306, the structure 304, and other suitable objects that may be present in the manufacturing environment 300. Data 362 may be used by the carrier controller 332 to control the orientation 311 of the structure 304. For example, based on data 362, the carrier controller 332 may send information 330 for controlling the orientation 311 of the structure 304 and/or maintaining the desired orientation 310.

Data 362 also may be used to guide the plurality of mobile fixtures 308 along the path 314. Further, data 362 also may be used to identify a change to the path 314. For example, obstacles in the path 314 identified in data 362 may require changes to the path 314. These changes may be placed in information 330 and sent to the controller 326 for the mobile fixture 320, as well as the controllers for other mobile fixtures in the plurality of mobile fixtures 308.

The number of sensors 361 may take a number of different forms. For example and without limitation, the number of sensors 361 may include at least one of a visible light camera, an infrared camera, a laser measurement tool, an ultrasonic sensor, a pressure sensor, a motion detector, a gyroscope, and other suitable types of sensors that may be located within the manufacturing environment 300.

The orientation 311 of the structure 304 may be controlled by the plurality of mobile fixtures 308 without assistance from the carrier controller 332. For example and without limitation, the mobile fixture 320 may also include an orientation system 363. The orientation system 363 may be used by the mobile fixture 320 to control the orientation 311 and maintain the desired orientation 310 of the portion 328 of the structure 304. Collectively, the desired orientation 310 for the structure 304 may be maintained by the plurality of mobile fixtures 308 with the orientation system 363.

The orientation system 363 may include a laser measurement system 364 and a number of sensors 365. The laser measurement system 364 may illuminate the number of sensors 365 using a laser beam 366 to generate data 368 for use by the controller 326 to maintain the portion 328 of the structure 304 in the desired orientation 310.

The number of sensors 365 may be located in various locations 370 in the manufacturing environment 300. For example, the number of sensors 365 may be located on the mobile fixture 320, other mobile fixtures in the plurality of mobile fixtures 308, on the structure 304, on the tools 316, on the operators 318, and on other locations in the manufacturing environment 300. In this manner, the plurality of mobile fixtures 308 may interact or cooperate with each other to maintain the structure 304 in the desired orientation 310.

Data 368 may be used to maintain the desired orientation 310. Further, data 368 also may be used to control movement of the plurality of mobile fixtures 308 of the carrier system 306 in the manufacturing environment 300. This movement may be along the path 314 or adjustments based on obstacles that may be identified.

Figure 3:
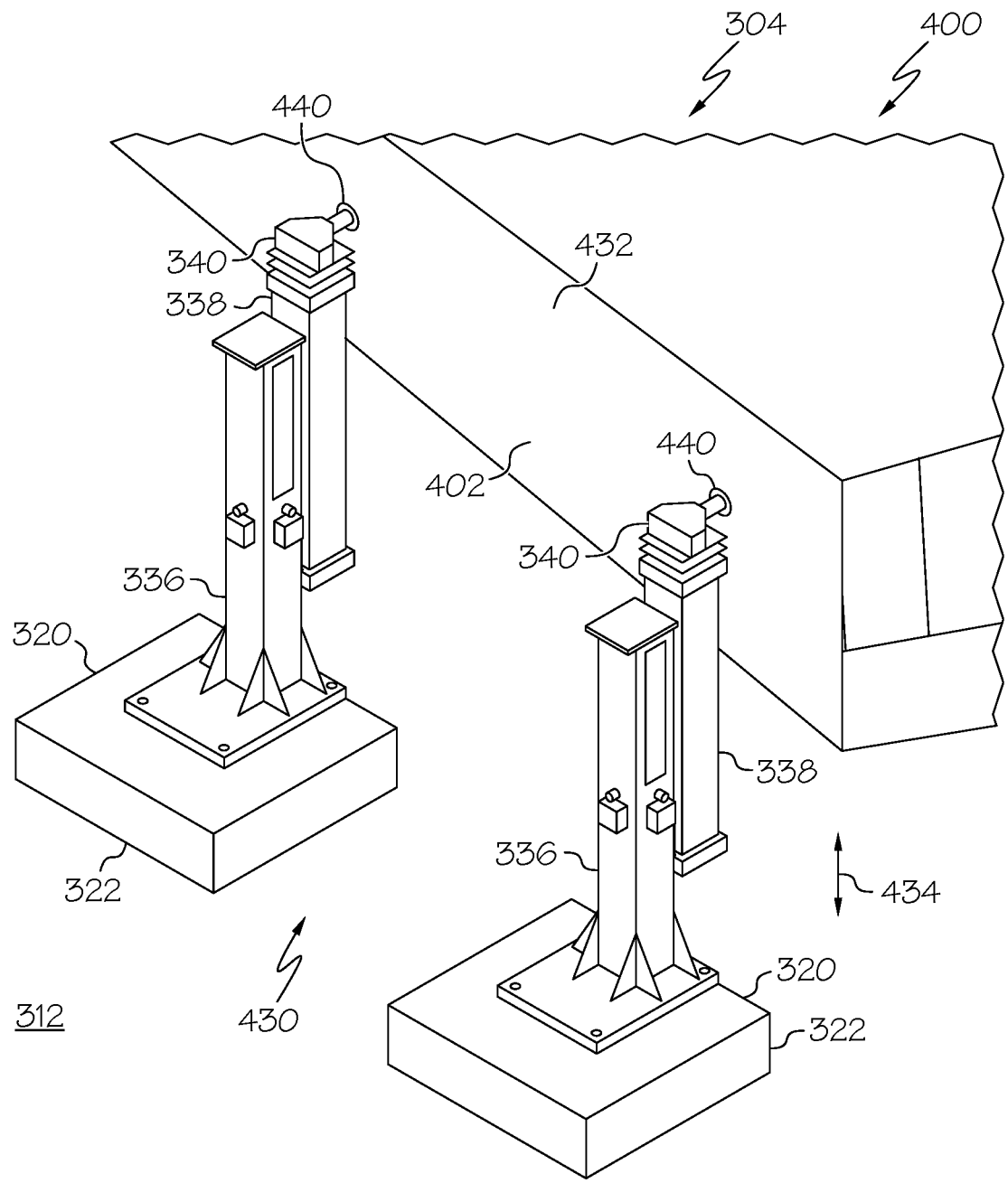
FIG. 3 is a perspective view of a portion of the carrier system of FIG. 1.

The structure 304 may be manufactured using a number of parts. As one illustrative example, the structure 304 may be manufactured using a part 305. For example and without limitation, the structure 304 may be a wing and the part 305 may be a wing box or a spar 432 (FIG. 3). Depending on the implementation, the part 305 may be a frame for the structure 304, a housing for the structure 304, a number of components previously assembled for the structure 304, the structure 304 itself, and/or some other type of part for the structure 304.

The plurality of mobile fixtures 308 may be configured to support the part 305 and move the part 305 to a number of different stations along an assembly line 371 for manufacturing the structure 304. In one illustrative example, the path 314 may be a path for the assembly line 371.

As used herein, a station along the assembly line 371 may be any location along the path 314. A station may be a location at which a group of tools 316 may be present for performing operations for manufacturing the structure 304. In some cases, a station in the assembly line 371 may be a location to which a group of tools 316 are moved to perform the operations for manufacturing the structure 304.

The plurality of mobile fixtures 308 may be configured to support and move the part 305 in a coordinated manner along the path 314 of the assembly line 371 to different stations along the assembly line 371. The tools 316 may be used to perform operations for manufacturing the structure 304 using the part 305. The plurality of mobile fixtures 308 may control the orientation 311 of the part 305, such that the orientation 311 of the part 305 may be changed at different stations along the assembly line 371. Further, the plurality of mobile fixtures 308 may substantially maintain the desired orientation 310 for the part 305 while moving the part 305 from one station to another station in the assembly line 371.

The illustration of the manufacturing environment 300 in FIG. 2 is not meant to imply physical or architectural limitations to the manner in which an example embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an example embodiment.

In an example implementation, the plurality of mobile fixtures 308 in the carrier system 306 may be all of the same type or different types of mobile fixtures. For example and without limitation, the plurality of mobile fixtures 308 may be heterogeneous mobile fixtures or homogeneous mobile fixtures, depending on the particular implementation. When different types of mobile fixtures are used in the plurality of mobile fixtures 308, those mobile fixtures may have different dimensions or sizes. For example, some mobile fixtures 320 in the plurality of mobile fixtures 308 may have larger support systems 323 than others. As another example, some mobile fixtures 320 of the plurality of mobile fixture 308 may have different types or configurations of connection systems 340 than others.

As another example implementation, the mobile fixtures in the plurality of mobile fixtures 308 may cooperate with each other to move the structure 304. In other words, information 330 from the carrier controller 332 may be optional (e.g., the functions performed by the carrier controller 332 may be integrated with different controllers 326 in the plurality of mobile fixtures 308).

Also, depending on the particular implementation, the controller 326 in the mobile fixture 320 may run software. This software may have different amounts of functionality and/or intelligence. For example, the software may be a neuro-network, an expert system, an artificial intelligence system, or some other suitable type of program. In other illustrative examples, the controller 326 may be hardware configured to perform operations in response to commands in information 330.

Although an example embodiment has been described with respect to aircraft, the example embodiments may be applied to other types of platforms. For example and without limitation, other example embodiments may be applied to a mobile platform, a stationary platform, a land-based structure, an aquatic-based structure, a space-based structure, or some other suitable platform. More specifically, the different example embodiments may be applied to, for example and without limitation, a submarine, a bus, a personnel carrier, a tank, a train, an automobile, a spacecraft, a space station, a satellite, a surface ship, a power plant, a dam, a manufacturing facility, a building, and/or some other suitable platform.

Referring to FIG. 1, the carrier system 306 may be used to carry the structure 304. In an example implementation, the structure 304 may be a wing 400. As depicted, the carrier system 306 may include a plurality of mobile fixtures 308. The plurality of mobile fixtures 308 may be present on a first side 402 (e.g., aft side) of the wing 400 and a second side 404 (e.g., forward side) of the wing 400.

The plurality of mobile fixtures 308 may coordinate movement to move the wing 400 in the direction of arrow 406 and/or arrow 408 and/or arrow 410 and/or arrow 412 and/or arrow 411 and/or arrow 413 (e.g., along the X-axis 414, the Y-axis 416, and/or the Z-axis 418). Further, the plurality of mobile fixtures 308 may move the wing 400 while maintaining the desired orientation 310. For example, the plurality of mobile fixtures 308 may also move (e.g., rotate) the wing 400 (e.g., about the Z-axis 418). The plurality of mobile fixtures 308 may perform other movements of the wing 400.

In an example implementation, a first portion of mobile fixtures in the plurality of mobile fixtures 308 may move the wing 400, while a second portion of mobile fixtures in the plurality of mobile fixtures 308 may be moved. For example, mobile fixture 420 in the plurality of mobile fixtures 308 may apply a force to move the wing 400 along the X-axis 414 and the Y-axis 416. Mobile fixture 422 may apply a force to move in the direction of the X-axis 414 but may be free to move along the Y-axis 416. A mobile fixture 320 (FIG. 2) may be "free" in a direction when the mobile fixture 320 is configured to be moved without applying a force in that direction.

As another example, a group of mobile fixtures 424 in the plurality of mobile fixtures 308 may be free to be moved along both the X-axis 414 and the Y-axis 416. In other words, the group of mobile fixtures 424 may not exert a force to move the wing 400. A group of mobile fixtures 426 in the plurality of mobile fixtures 308 may apply a force in the direction of the Y-axis 416 but may be free to be moved along X-axis 414.

Those skilled in the art will appreciate that other groupings of the plurality of mobile fixtures 308 may be made to apply a force to move the wing 400 in various directions along directions 406, 408, 410, 412, 411, 413 (e.g., along the X-axis 414, the Y-axis 416, and/or the Z-axis 418). In an example, all of the plurality of mobile fixtures 308 may apply a force to move the wing 400. In another example, none of the plurality of mobile fixtures 308 may apply a force. Instead, a force may be applied by another source.

These movements of the plurality of mobile fixtures 308 may be considered to be in a coordinated manner. The fixed and free directions of the plurality of mobile fixtures 308 may be controlled by the carrier controller 332 (FIG. 2) or through communications between controllers (not shown) in the plurality of mobile fixtures 308.

Referring to FIG. 3, a portion 428 the carrier system 306 is shown in greater detail. As depicted, a pair of mobile fixtures 430 (identified individually as mobile fixture 320, as shown in FIG. 2) may be part of the plurality of mobile fixtures 308 (FIG. 1). The pair of mobile fixtures 430 may be connected to the first side 402 of wing 400.

In an example embodiment, each mobile fixture 320 of the plurality of mobile fixtures 308 may include the motorized base 322, the post 336, the support member 338, and the connector system 340. In an example implementation, the connector system 340 may be connected to a spar 432 of the wing 400. As illustrated, the member 338 may be moveable in the direction of arrow 434. The member 338 of each mobile fixture 320 may be individually moveable to provide a desired connection to the wing 400. Thus, the connector system 340 of each mobile fixture 320 (FIG. 3) may be connected to a connection point 440 upon the spar 432 independent of all of the other connection points 440.

Figure 4:
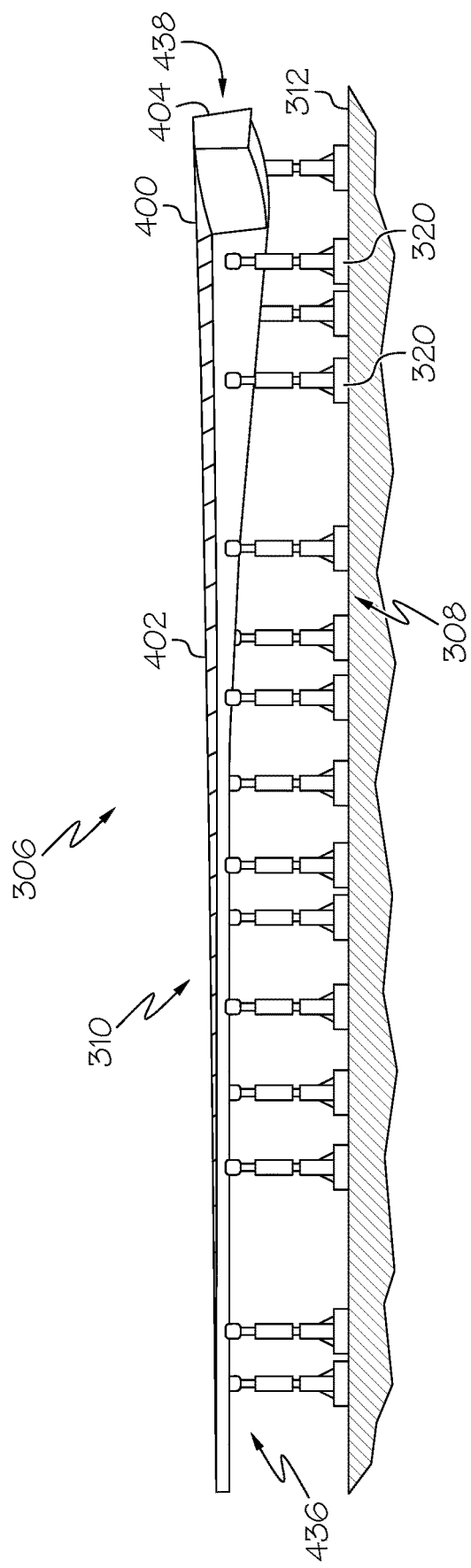
FIG. 4 is a side view of the carrier system of FIG. 1.

Referring to FIG. 4, the wing 400 may be supported and moved by the plurality of mobile fixtures 308. As can be seen, the plurality of mobile fixtures 308 may be connected to the first side 402 of the wing 400 as well as the second side 404 of the wing 400. The plurality of mobile fixtures 308 may be connected to and extend from proximate (e.g., at or near) a first end 436 of the wing 400 to proximate a second end 438 of the wing 400.

Each mobile fixture 320 of the plurality of mobile fixtures 308 may be placed directly on the surface 312 (e.g., a factory floor). Each member 338 may be adjusted to take into account variations that may occur in the surface 312 anywhere along the path 314 (FIG. 2). As a result, if surface 312 is uneven, the member 338 of each mobile fixture 320 of the plurality of mobile fixtures 308 may adjust to maintain the desired orientation 310 for the wing 400.

Figure 5:
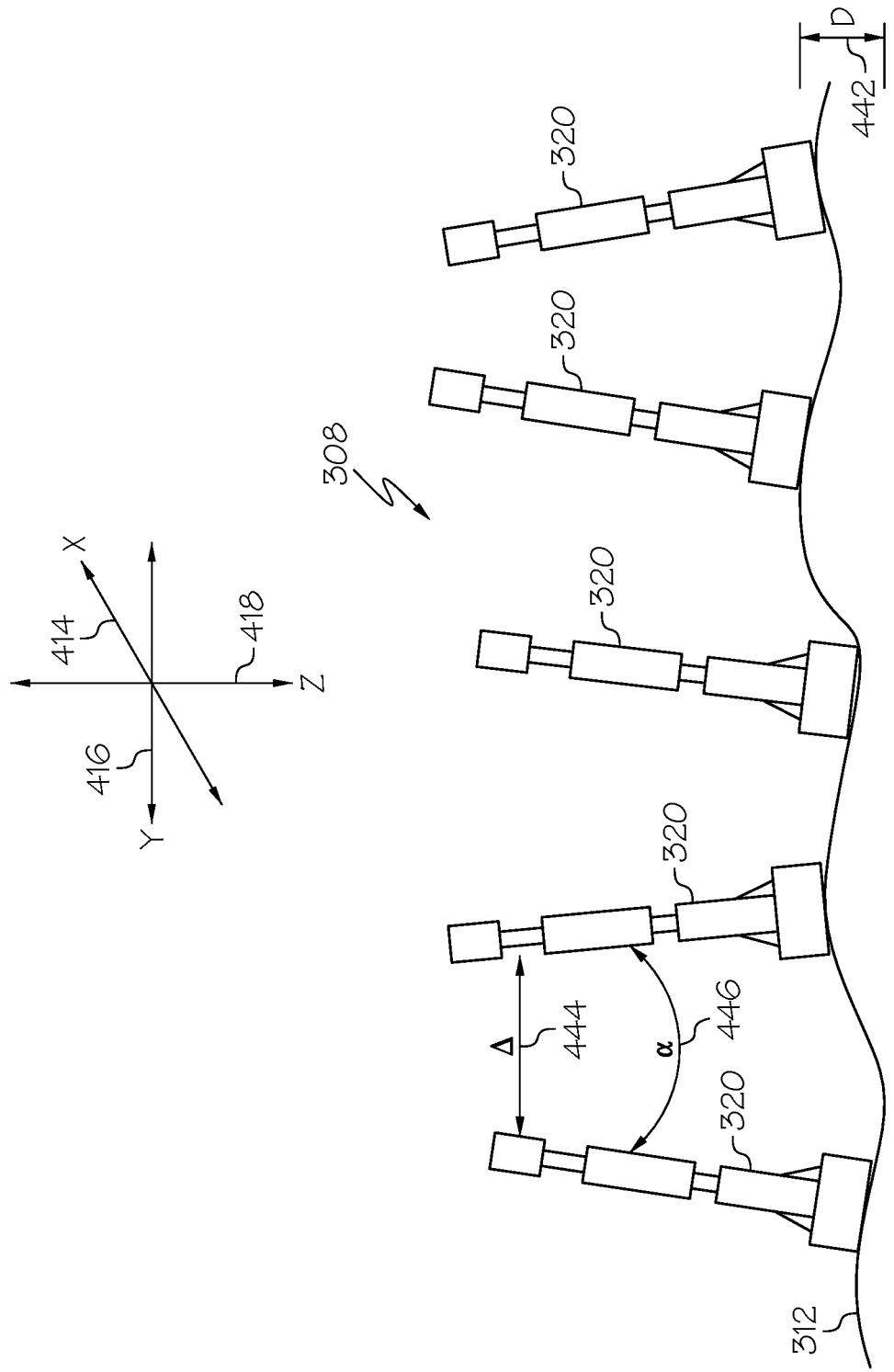
FIG. 5 is a schematic view of an embodiment of the disclosed plurality of mobile fixtures.

Referring to FIG. 5, a given surface 312 (e.g., factory floors) may have a flatness that can vary by a dimension D 442 (the surface 312 has been exaggerated for illustration purposes). It has been observed that there may be mismatches in parallelism in multiple dimensions between the plurality of mobile fixtures 308 as the plurality of mobile fixtures 308 traverse the surface 312. Furthermore, since the plurality of mobile fixtures 308 carry the structure 304 (e.g., the wing 400) from assembly location to assembly location, the parallelism mismatch from each mobile fixture 320 with respect to any other mobile fixture 320 (e.g., a directly adjacent mobile fixture 320) may change as the plurality of mobile fixtures 308 traverse across the surface 312. For example, the unevenness of the surface 311 (e.g., dimension D) may vary from approximately +1.00" to −1.00" at various locations from end 436 to end 438 of the wing 400 (FIG. 4).

As illustrated in FIG. 5, the mismatch in parallelism between any two mobile fixtures 320 may be identified by a linear variation Δ 444 and/or an angular variation α 446. The linear variation Δ 444 may take place along the X-axis 414, the Y-axis 416, and/or the Z-axis 418. The angular variation α 446 may take place about the X-axis 414, the Y-axis 416, and/or the Z-axis 418.

A rigid attachment between the connector system 340 and the structure 304 (e.g., wing 400) or the part 305 (e.g., spar 432) at the connection point 440 (FIG. 3) may be required for moving the structure 304 along the path 314 and between locations and/or to maintain the structure 304 in the desired orientation 310. However, given a rigid attachment that constrains movement in all directions (e.g., along the X-axis 414, along the Y-axis 416, along the Z-axis 418, about the X-axis 414, about the Y-axis 416, and/or about the Z-axis 418) the linear variations Δ 444 and/or the angular variations α 446 may induce undesirable stresses (e.g., torque) upon the structure 304 due to the mismatch in parallelism between the plurality of mobile fixtures 306, as each mobile fixture 320 traverses (e.g., driven) along uneven surface 312 (e.g., factory floor).

Accordingly, as described in more detail below, the mobile fixture 320 may be configured to account for the linear variations Δ 444 and/or certain angular variations α 446 and may include tooling (e.g., a connector 346 (FIG. 6)) configured to account for certain angular variations α 446 in order to prevent possible unnecessary and/or undesirable stresses from being applied to or induced upon the structure 304.

Figure 6:
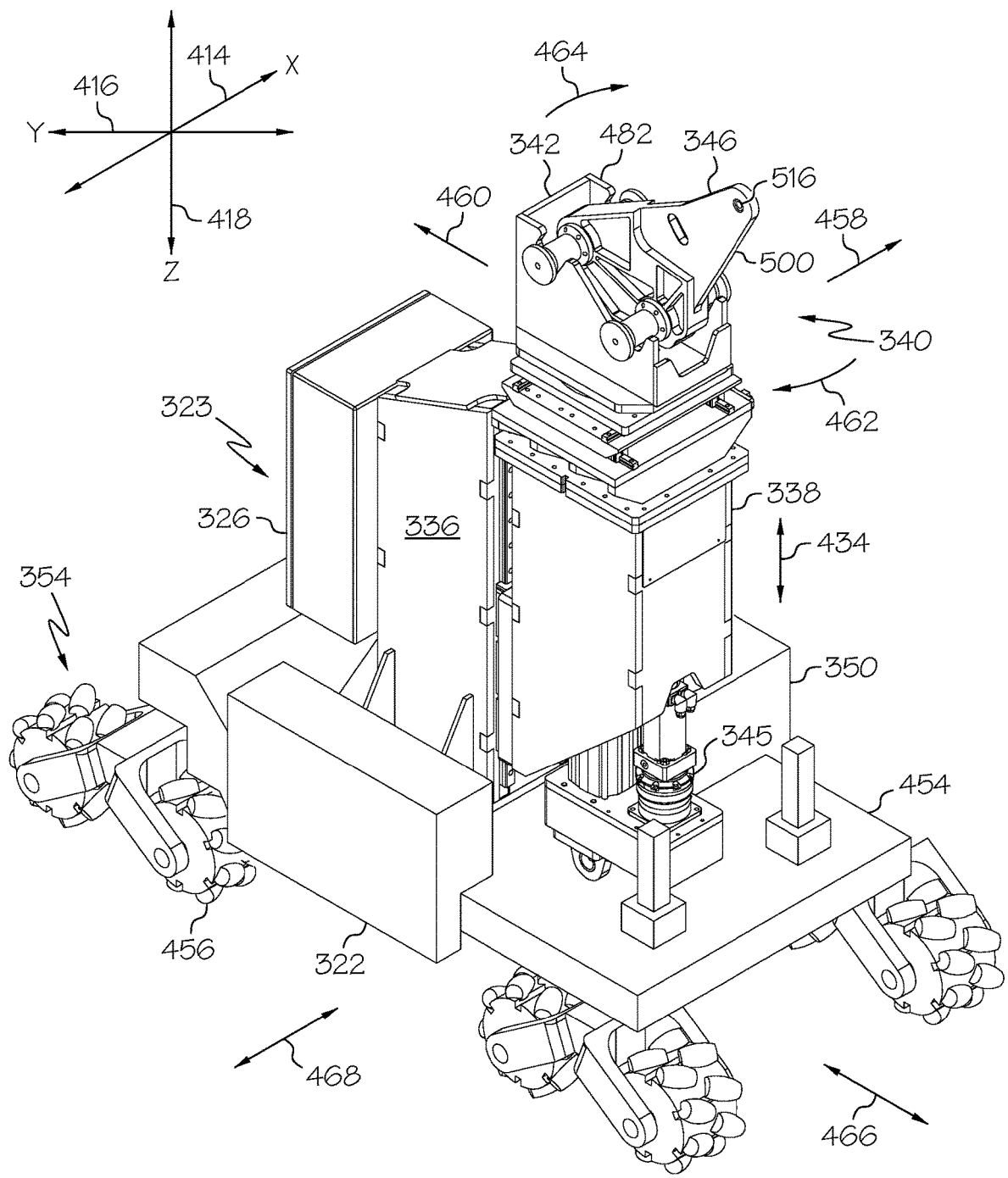
FIG. 6 is a perspective view of an embodiment of the disclosed mobile fixture.

Referring to FIG. 6, another embodiment of the mobile fixture 320 may include the motorized base 322 and the support system 323. The support system 323 may include the post 336, the support member 338, and the connector system 340. The post 336 may extend from a surface 454 of the housing 350 of the motorized base 322. The post 336 may be substantially perpendicular to the surface 454 of the housing 350 of the motorized base 322.

The support member 338 may move relative to the post 336. The movement system 345 may be configured to move the member 338 relative to the post 336. For example, the movement system 345 may move the member 338 in the direction of arrow 434 (e.g., along the Z-axis 418) relative to the post 336.

The connector system 340 may include the connector 346 and the positioning system 342. The connector 346 may move relative to the member 338. The positioning system 342 may be configured to move the connector 346 relative to the member 338. For example, the positioning system 342 may provide for movement of the connector 346 in the direction of arrow 458 (e.g., along the X-axis 414) and/or arrow 460 (e.g., along the Y-axis 416). The positioning system 342 may also provide for movement of the connector 364 in the direction of arrow 462 and arrow 464 (e.g., about the Z-axis 418).

The motorized base 322 may be generally rectangular in shape and may include a plurality of sides, a top, and a bottom. However, other shapes, such as a circular shape, a square shape, a triangular shape, a cylindrical shape, a cuboidal shape, and any other suitable shape are also contemplated.

In the illustrated embodiment, the motorized base 322 may employ a plurality of wheels 354. The wheels 354 may take the form of motorized wheels 456. In another example embodiment, the motorized base 322 may employ one or more tracks 353 (FIG. 2). The tracks 353 may take the form of magnetic tracks 356 configured to magnetically engage the metal portion 358 of the surface 312 (FIG. 2).

The number of motors 352 (FIG. 2) may be connected to the wheels 354 (or the tracks 353). The controller 326 may be connected to the number of motors 352. For example, the controller 326 may be connected to an interior or exterior surface of the housing 350. The power system 324 (e.g., the wireless power system 360) may provide power 359 (FIG. 2) to the number of motors 352 and the controller 326.

The motorized base 350 of mobile fixture 320 may move in different directions, such as those indicated by arrow 466 and/or arrow 468 and/or any combination of arrows 466, 468. In other words, the mobile fixture 320 may be moved forward or backward, left or right, and may turn, rotate, and perform other types of movements.

Figure 7:
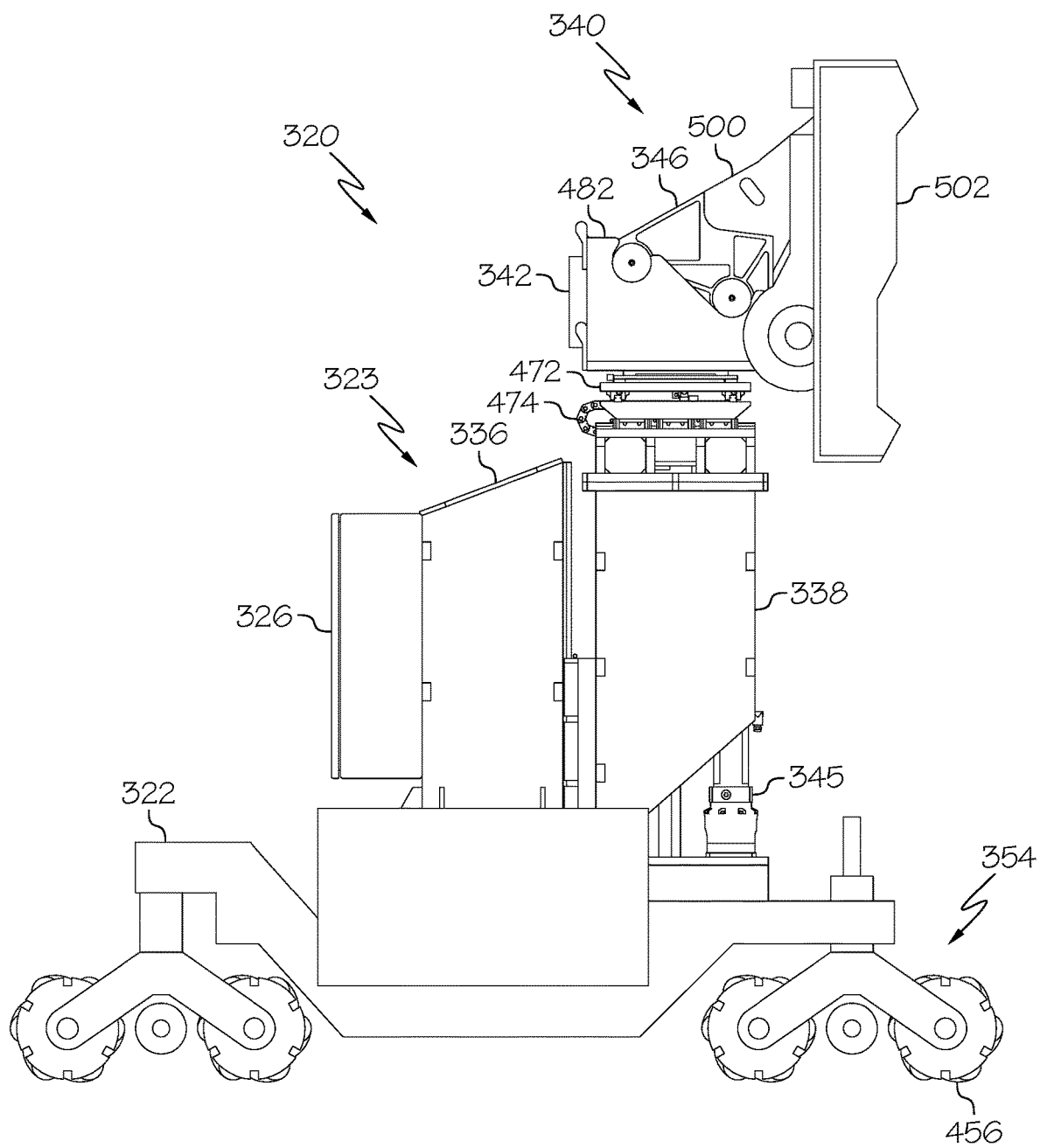
FIG. 7 is a side view of another embodiment of the disclosed mobile fixture.
Figure 8:
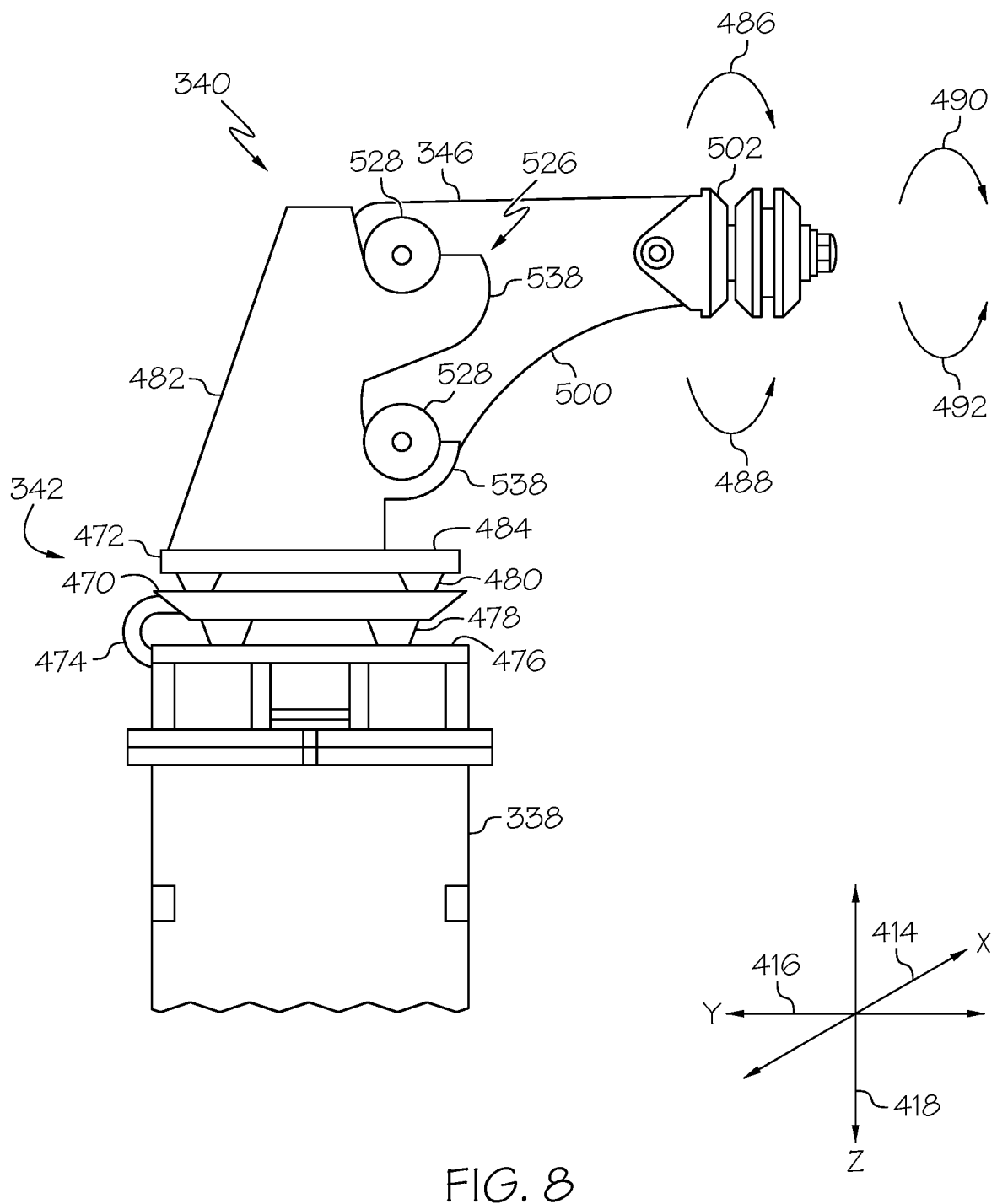
FIG. 8 is a side view of an embodiment of the disclosed connector system.

Referring to FIGS. 7 and 8, in an example construction, the positioning system 342 may include at least a first planar member 470 and a second planar member 472. The first planar member 470 may be connected to a surface 476 of the member 338 by at least one guide 476 (FIG. 8). The second planar member 472 may be connected to first planar member 470 by at least one guide 480 (FIG. 8). The guides 478 may allow the first planar member 470 to move relative to the surface 476 (FIG. 8) of the member 338 and the guide 480 may allow the second planar member 472 to move relative to the first planar member 470. Additional guides (not shown) may be provided in order to allow movement and/or rotation of the first planar member 470 and the second planar member 472 in one or more of the directions of arrows 458, 460, 462, 464 (FIG. 6).

In an example construction, one or more of guide 479 and guide 480 may be moved by the operators 318 (FIG. 2). In another example construction, one or more of guide 479 and guide 480 may be motorized guides that may be moved by a drive system 474 under the control of controller 326 (FIG. 7).

The drive system 474 may be configured to drive the planar members 470, 472 along respective guides 478, 480 to position the connector 346. For example, the drive system 474 may provide for movement (e.g., through application of a force) of the connector 346 in the direction of arrow 458 (e.g., along the X-axis 414), arrow 460 (e.g., along the Y-axis 416) and/or arrows 462, 464 (e.g., about the Z-axis 418), as shown in FIG. 6. The power system 324 may provide power 359 (FIG. 2) to the drive system 474. The drive system 474 may allow the connector 346 to move as well as lock the connector 346 into place along the X-axis 414, along the Y-axis 416, and/or about the Z-axis 418.

The guides 478, 480 may be free to move when mobile fixture 320 is stationary. In this manner, the guides 478, 480 may move during assembly, fabrication, and/or other manufacturing operations. This ability of the guides 478, 480 to move may prevent inducing loads into the structure 304 (e.g., a wing 400) (FIG. 1) being transported, assembled, or processed.

For example, when the mobile fixture 320 begins to move, one or more of the guides 478, 480 may be fixed in order to prevent inertial loading of the structure 304. As the mobile fixture 320 moves across the surface 312 (FIG. 5), one or more of the guides 478, 480 may be released in order to prevent stress loading upon the structure 304. Releasing one or more of the guides 478, 480 may prevent linear stress loading. However, this may not prevent undesirable torques from being induced upon the structure 304. Prevention of torque loading may be accomplished by the connector 346, as described in more detail below. The connector 346 may allow for rotational degrees of freedom (e.g., about the X-axis 414 and/or Y-axis 416) to be locally restrained (e.g., stiff) at the mobile fixture 308 (e.g., about the guides 478, 480) for positioning purposes, however, allowing for these degrees of freedom at the interface of the connector 346 and the structure 304. In other words, one or more of the guides 478, 480 may not move in certain directions and one or more of the guides 478, 480 may be free to move (e.g., linearly along the X-axis 414 and/or Y-axis 416) and/or rotate (e.g., rotationally about the Z-axis 418) in certain directions when the structure 304 is being transported by the mobile fixture 320.

Referring back to FIG. 6, in an example implementation, the connector 346 may be rigidly connected to the positioning system 342 (e.g., via a connection holder 482). The connector 346 may be driven and locked (e.g., by the positioning system 342) in the direction of arrow 458 (e.g., along the X-axis 414). The connector 346 may be driven (e.g., by the positioning system 342) and free move in the direction of arrow 460 (e.g., along the Y-axis 416). The connector 346 may be free to rotate (e.g., by the positioning system 342) in the direction of arrows 462, 464 (e.g., about the Z-axis 418). The positioning system 342 may include a pivot connection (not shown) relative to the support member 338 and rotational drive mechanism (not shown). The rotational drive mechanism may be controlled by the drive system 474.

Referring again to FIG. 8, as illustrated, the connector system 340 may include the connector 346 and the positioning system 342. The positioning system 340 may include a connector holder 482. The connector holder 482 may be configured to receive and support the connector 346. The holder 482 may extend from a surface 484 of the second planar member 472. The holder 482 may be substantially perpendicular to the surface 484 of the second planar member 472.

As described above, the positioning system 342 may provide for movement along the X-axis 414, along the Y-axis 416, and/or about the Z-axis 418. The connector 346 may provide for movement (e.g., rotation) about the X-axis 414 and/or about the Y-axis 416.

Figure 9:
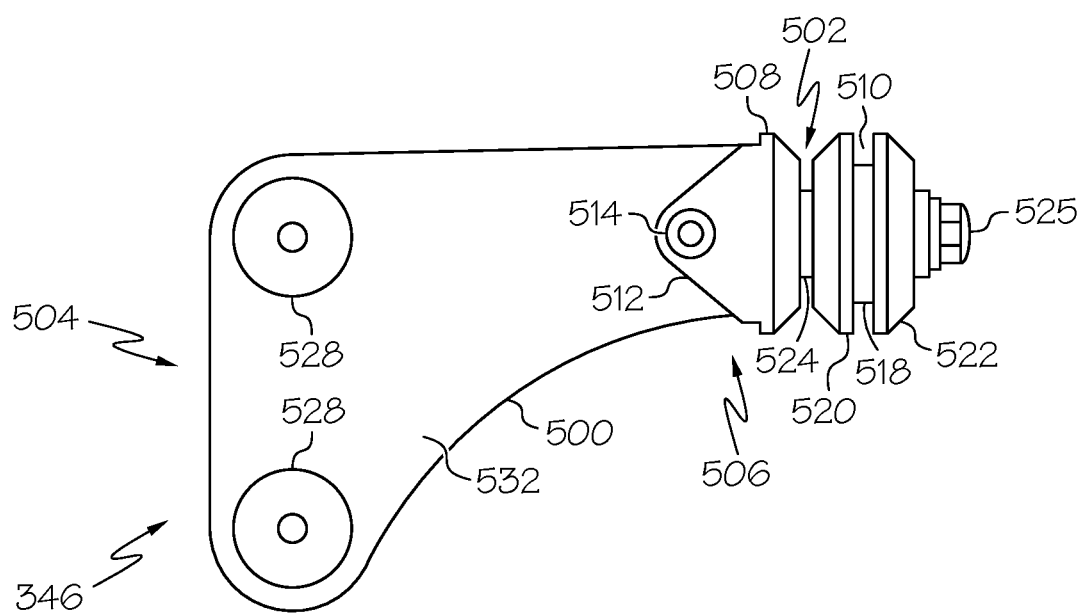
FIG. 9 is side view of an embodiment of the disclosed connector.

The connector 346 may include a body 500 and an attachment member 502. The body 500 may extend from the holder 482. The body 500 may include a first end 504 and an opposed second end 506 (FIG. 9). The attachment member 502 may extend from the second end 506 of the body 500 opposite the holder 482. The attachment member 502 may be configured to be connected to the structure 304 (e.g., a wing 400) or to the part 305 (e.g., a spar 432).

The attachment member 502 may be moveable relative to the body 500. The attachment member 502 may provide for movement in the direction of arrow 486 and arrow 488 (e.g., about the X-axis 414) and/or in the direction of arrow 490 and arrow 492 (e.g., about the Y-axis 416).

Referring to FIG. 9, the attachment member 502 may include a clev and a second connector member 510. The first connector member 508 may be moveably (e.g., rotatably) connected to the second end 506 of the body 500. For example, the first connector member 508 may be free to rotate relative to the body 500 in the direction of arrow 486 and arrow 488 (e.g., about the X-axis 414) (FIG. 8).

The second connector member 510 may be moveably (e.g., rotatably) connected to the first connector member 508. For example, the second connector member 510 may be free to rotate relative to the first connector member 508 in the direction of arrow 490 and arrow 492 (e.g., about the Y-axis 416) (FIG. 8). The second connector member 510 may be configured to be connected to at least one connection point 440 of the structure 304, for example on the wing 400 or the spar 432 (FIG. 3).

Figure 10:
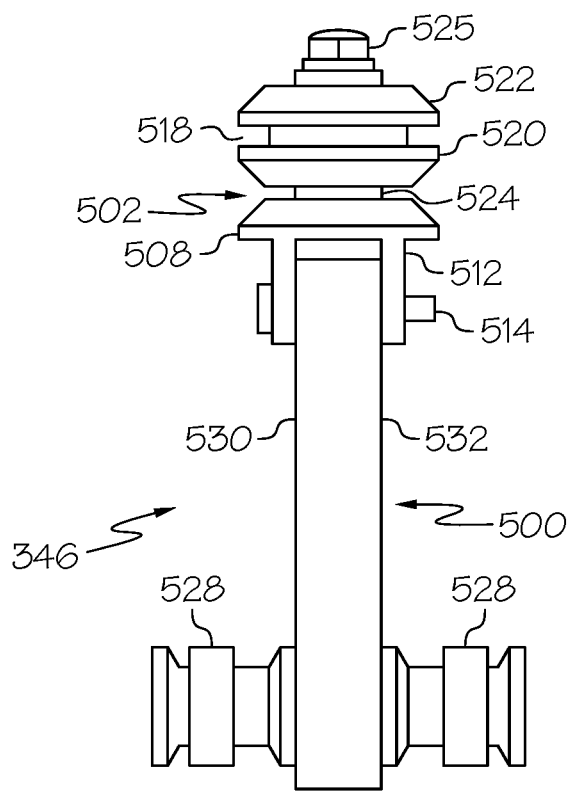
FIG. 10 is a top view of the connector of FIG. 9.

Referring to FIG. 10, in an example construction, the first connector member 508 may take the form of a clevis 512. The clevis 512 may be configured to receive the second end 506 of the body 500. The clevis 512 may be connected to the body 500 by any suitable fastener 514 that allows for free rotation. For example, the fastener 514 may be a pin and the clevis 512 may rotate about an axis defined by the pin. The body 500 may include a fastener aperture 516 (FIG. 6) proximate the second end 506 configured to receive the fastener 514.

In an example construction, the second connector member 510 may take the form of a clamp 518. The clamp 518 may include a first pressure pad 520 and an opposed second pressure pad 522. The pressure pads 520, 522 may be rotatably connected to a clamp shaft 524. The clamp shaft 524 may be rigidly connected to the clevis 512 opposite the body 500. A fastener 525 may be connected to an end of the clamp shaft 524 to secure the pressure pads 520, 522 on the clamp shaft 524. Each pressure pad 520, 522 may include a bearing (e.g., a roller bearing) (not shown) configured to allow free rotational movement of the pressure pad 520, 522 around an axis defined by the clamp shaft 524.

In an example implementation, the connection point 440 may take the form of an aperture disposed through the spar 432 (FIG. 3). The fastener 525 and the second pad 522 may be removed from the clamp shaft 524. The clamp shaft 524 may be inserted through the connection point 440 such that the first pad 520 is in contact with a surface of the spar 432. The second pad 522 may be positioned on the clamp shaft 524 in contact an opposing surface of the spar 432. The fastener 525 may be connected to clamp shaft 524 and tightened in order to clamp the spar 432 between the opposed pads 520, 522.

Thus, as the mobile fixture 320 (FIG. 6) moves, the first connector member 508 is free to move relative to the body 500 and the second connector member 510 is free to move relative to the first connector member 508 in order to prevent stress loading (e.g., torque) of the structure 304. In other words, the first connector members 508 may be free to rotate about the X-axis 414 and/or the second connector members 508 may be free to rotate about the Y-axis 416 when the structure 304 is being transported or positioned in the desired orientation 310 (FIG. 2) by the mobile fixture 320.

Referring again to FIG. 8, the connector 346 may be rigidly connected (e.g., releasably) or attached (e.g., fastened or integral) to the holder 482. In an example construction, the connector system 340 may include a positioning interface 526 configured to secure the connector 346 at a desired position relative to the holder 482. The connector 346 may include a plurality of posts 528. The holder 482 may include a plurality of cradles 538 configured to receive the posts 528 upon the connector 346 being mounted to the holder 482.

As shown in FIGS. 9 and 10, in an example implementation, the posts 528 may extend from a first side 530 and an opposed second side 532 of the body 500. The posts 528 may be proximate (e.g., at or near) the first end 504 of the body 500. The posts 528 may be substantially perpendicular to the body 500.

Figure 11:
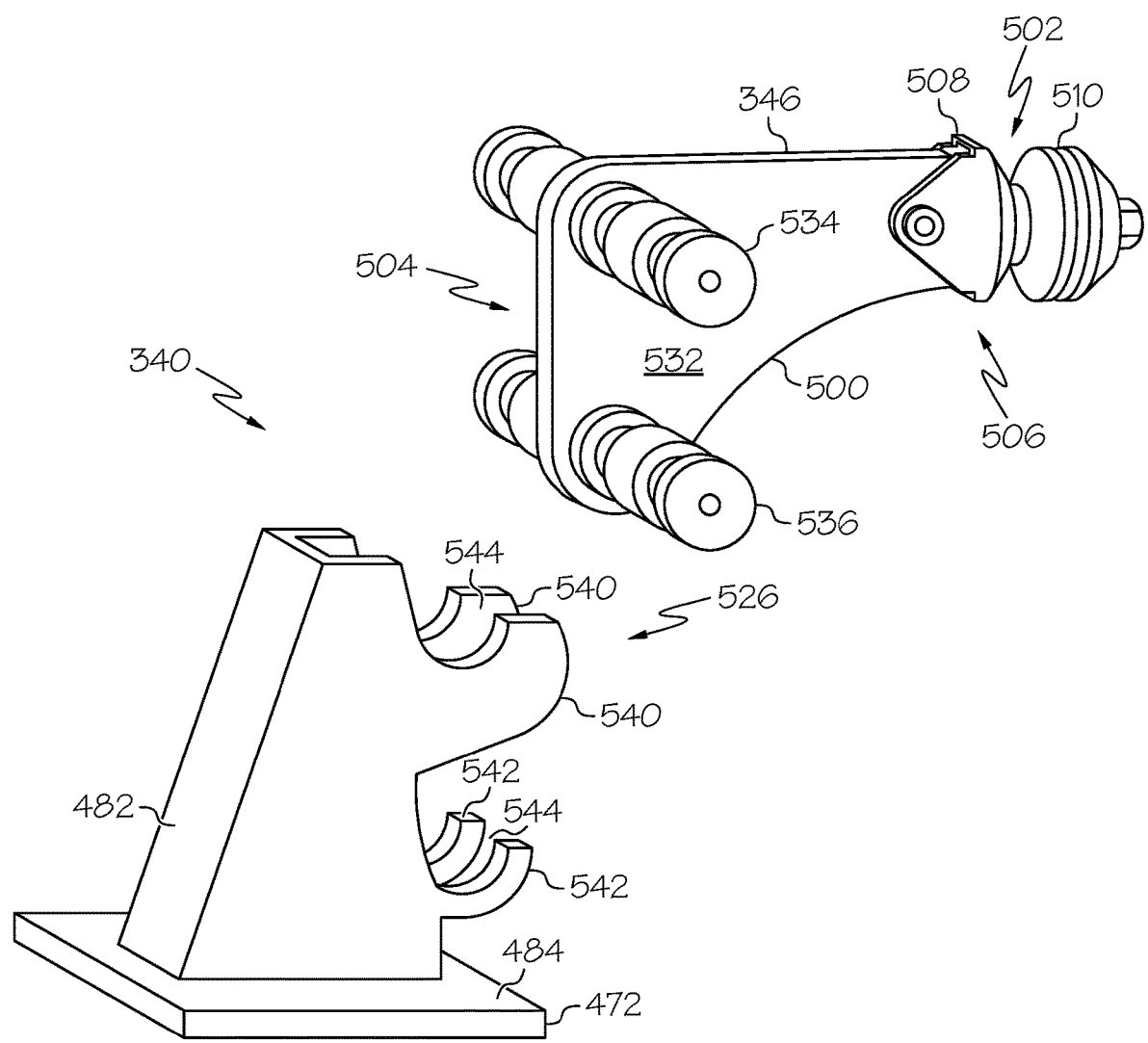
FIG. 11 is an exploded perspective view of the connector system of FIG. 8.

Referring to FIG. 11, for example, a first (e.g., upper) post 534 and a second (e.g., lower) post 536 may extend from each side 530, 532 (only the second side is shown) of the body 500. The first post 534 may be proximate an upper end of the body 500 and the second post 536 may be proximate a lower end of the body 500. The holder 482 may include a first (e.g., upper) pair of cradles 540 and a second (e.g., lower) pair of cradles 542. Each pair of cradles 540, 542 may be spaced apart defining a gap 544 in the holder 482. The gap 544 may be configured to receive the first end 504 of the body 500 upon the posts 534, 536 being received by the cradles 540, 542.

Those skilled in the art will appreciate that the connector 346 in FIG. 6, in FIG. 7, and in FIG. 8 may have different configurations. As an example, the posts 528 may be aligned (e.g., vertically) or offset depending upon the configuration of the holder 482 and the cradles 538 and the desired position of the connector 346. As another example, the connector 346 may be positioned substantially parallel to the surface 312. As another example, the connector 346 may be positioned at a non-zero angle relative to the surface 312. As another example, the body 500 of the connector 364 may have any shape or size. As another example, the attachment member 502 may take the form of a bracket, a spanner, or other suitable attachment member depending upon the configuration of structure 304, the part 305, or the connection point 440. The plurality of mobile fixtures 308 illustrated in FIGS. 1 and 3 may include these and other configurations for connectors and mobile fixtures, depending on the particular implementation.

Figure 12:
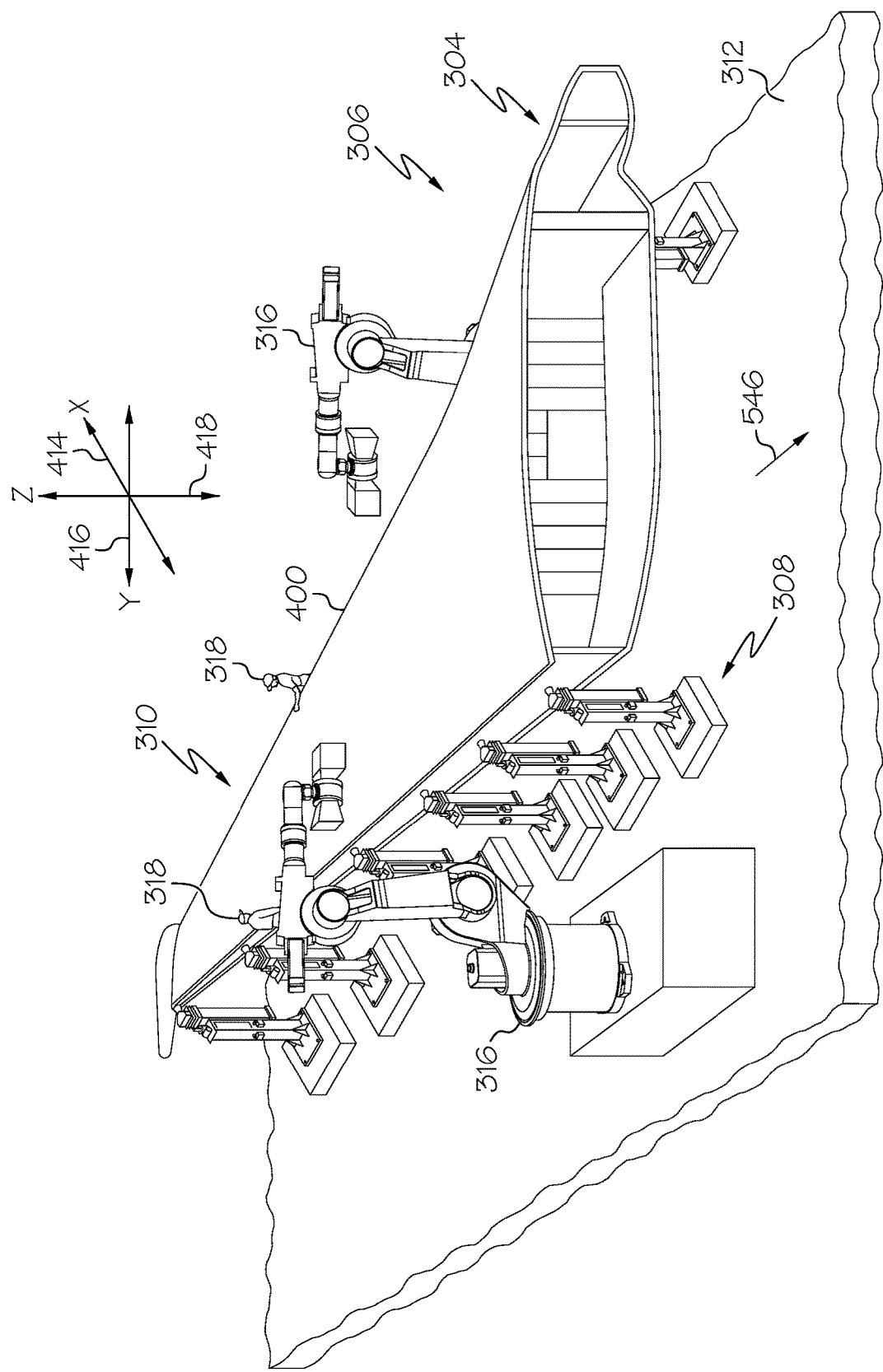
FIG. 12 is a perspective view of another embodiment of the disclosed carrier system.

Referring now to FIG. 12, an example implementation of the carrier system 306 may employ the plurality of mobile fixtures 308 to support the structure 304, which may take the form of the wing 400. In this example, the carrier system 306 may move the wing 400 in the direction of arrow 546.

While moving in the direction of arrow 546, different operations may be performed on the wing 400. These operations may be performed by one or more operators 318. Operations also may be performed by one or more tools 316. These operations may be performed while carrier system 306 moves the wing 400 in the direction of arrow 546 and/or while the carrier system 306 is stationary.

Each of the plurality of mobile fixtures 308 may be configured to move and secure the wing 400 at the desired orientation 310 along the Z-axis 418 via the movement system 345. Each of the plurality of mobile fixtures 308 may be configured to move and secure the wing 400 at the desired orientation 310 along the X-axis 414, along the Y-axis 416, and/or about the Z-axis 418 via the positioning system 342. The connector 346 of each of the plurality of mobile fixtures 308 may be configured to allow free movement of the wing 400 along the X-axis 414 and/or the Y-axis 416 via the attachment member 502.

Figure 13:
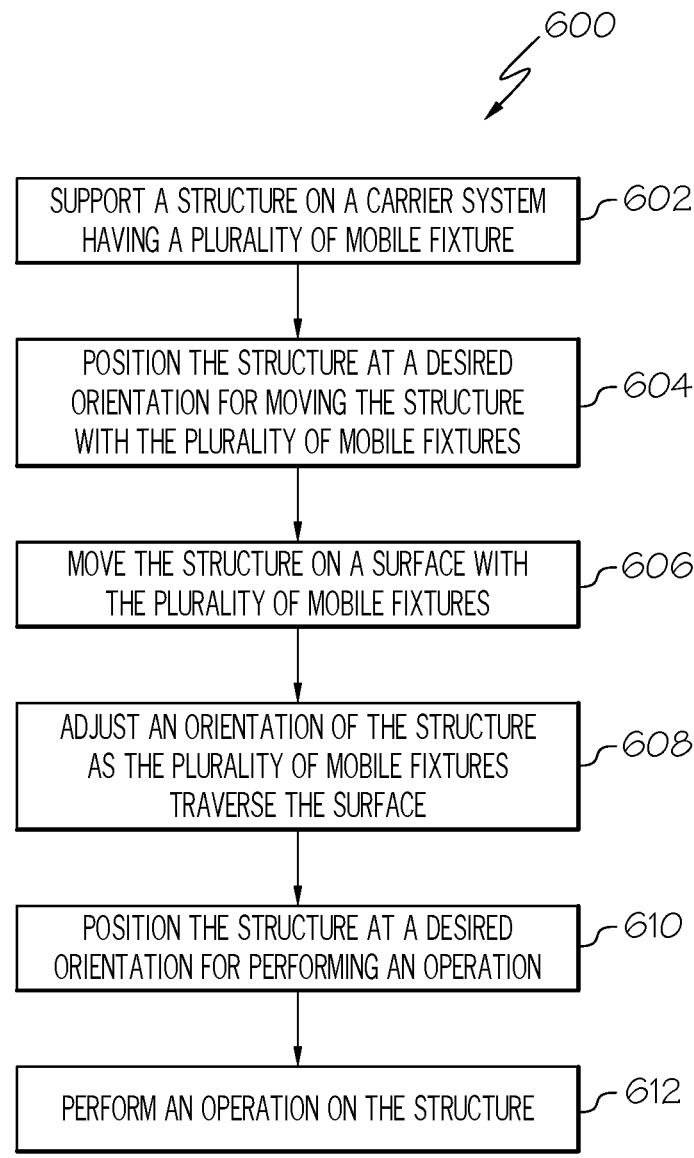
FIG. 13 is a flow chart depicting an embodiment of the disclosed method for manufacturing a structure.

Referring to FIG. 13, also disclosed is a method, generally designated 600, for manufacturing a structure 304 (FIG. 2). The operations illustrated in FIG. 15 may be implemented in the manufacturing environment 300 (FIG. 2). In particular, the process may be implemented using the carrier system 306 having a plurality of mobile fixtures 308.

As shown at block 602, the method 600 may include the step of supporting the structure 304 on the carrier system 306 having a plurality of mobile fixtures 308. The connector 346 of each mobile fixture 320 (FIG. 6) may be connected to a portion 328 (FIG. 2) of the structure 304 (e.g., at the connection point 440 (FIG. 3)) in order to control the orientation 311 (e.g., the desired orientation 310) of the structure.

As shown at block 604, the plurality of mobile fixtures 308 may position the structure 304 at the desired orientation 310 (FIG. 2) for movement. For example, each individual mobile fixture 320 of the plurality of mobile fixtures 308 may position the attached portion 328 of the structure 304 at the desire orientation 310 along the X-axis 414, along Y-axis 416, along the Z-axis 418 and/or about the Z-axis 418.

As shown at block 606, the structure 304 may be moved using the plurality of mobile fixtures 308 of the carrier system 306 on the surface 312. The movement of the plurality of mobile fixtures 308 may be performed in a coordinated manner. The plurality of mobile fixtures 308 may be considered to move in a coordinated manner when the plurality of mobile fixtures 308 moves as a group to move the structure 304 in a desired direction or to a desired location. The plurality of mobile fixtures 308 may be controlled or may communicate with each other to move the structure 304.

As shown at block 608, the connector 346 of each mobile fixture 320 of the plurality of mobile fixture 308 may allow the orientation 311 of the structure 304 to adjust as the plurality of mobile fixtures 308 traverse across the surface 312 in order to relieve and prevent any induced stresses (e.g., torque) upon the structure 304 due to mismatches in parallelism between mobile fixtures 320 of the plurality of mobile fixtures 308. For example, the mobile fixture 320 may control the applied stresses along the X-axis 414, along the Y-axis 416, along the Z-axis 418, and/or about the Z-axis 418 of motion. The connector 346 (FIG. 8) may allow rotation about the X-axis 414 and/or about the Y-axis 416 to control (or prevent) rotational stresses (e.g., torques) induced upon the structure 304.

As shown at block 610, the plurality of mobile fixtures 308 may position the structure 304 at a desired orientation 310 (FIG. 8) for performing manufacturing or assembly operations. For example, each individual mobile fixture 320 of the plurality of mobile fixtures 308 may position the attached portion 328 of the structure 304 at the desire orientation 310 relative to an operator 318 or a tool 316 (FIG. 8).

As shown at block 612, manufacturing or assembly operations may be performed on the structure 304.

Operational steps 602 through 612 may be performed one after another or at the same time. For example, the plurality of mobile fixtures 308 may move the structure 304 to a station at which tools 316 may be located. As the structure 304 is being moved on the surface 312, each mobile fixture 320 may correct for any linear variations Δ 444 between a directly adjacent mobile fixture 320 by allowing the portion 328 of the structure 304 to move along the X-axis 414, the Y-axis 416, and/or the Z-axis 418.

As the structure 304 is being moved on the surface 312, each mobile fixture 320 may correct for certain angular variations α 446 between a directly adjacent mobile fixture 320 by allowing the portion 328 of the structure 304 to rotate (e.g., about the Z-axis 418).

As the structure 304 is being moved on the surface 312, the connector 346 of each mobile fixture 320 may correct for certain angular variations α 446 between a directly adjacent mobile fixture 320 by allowing the portion 328 of the structure 304 to rotate (e.g., about the X-axis 414 and/or the Y-axis 416). Then, the operations may be performed on structure 304.

In another example, the plurality of mobile fixtures 308 may move the structure 304 along the path 314 (FIG. 2). Tools 316 may be located along path 314 and may perform operations on the structure 304 as the structure 304 moves on the path 314. Each mobile fixture 320 and its associated connector 346 may adjust the orientation 311 of the structure 304 in response to any linear variations Δ 444 and/or angular variations α 446 (as described above) as the structure 304 moves on the path 314.

Thus, one or more example embodiments may be used to move structures in a manufacturing facility. In the illustrative examples, the carrier system 306 with the plurality of mobile fixtures 308 may be used to move the structure 304 to different tools 316 within the manufacturing environment 300. This movement may occur without requiring time to lift the structure 304 from one fixture to another fixture, from one fixture to a platform, from a platform to a fixture, or some other type of movement that may take more time than desired.

Further, with the connector 346 of the mobile fixture 320, any undesired induced stresses upon the structure 304 caused by unevenness of the surface 312 of the manufacturing facility may be avoided (or eliminated) by allowing the orientation 311 of the structure 304 (or a portion 328 of the structure 304) to freely move along certain directions.

Further, with the carrier system 306, the structure 304 may be moved along the path 314 in which tools 316 may be located such that operations may be performed on the structure 304 while the structure 304 moves along the path 314.

Further, the plurality of mobile fixtures 308 may allow for closer spacing of tools 316 relative to the structure 304 and may not interfere with tools 316 during movement of the structure 304. As a result, with the carrier system 306 using the plurality of mobile fixtures 308, floor space in the manufacturing environment 300 may be reduced. Also, production time for manufacturing structures, such as the structure 304, also may be reduced.

Further, the configuration of the manufacturing environment 300 may be made more easily with the use of the carrier system 306. Also, a reduction in tools 316 may be achieved using the plurality of mobile fixtures 308 in the carrier system 306. For example, without limitation, cranes and other lifting mechanisms may be reduced or avoided. As a result, the time needed to manufacture platforms, such as aircraft, may be reduced.

Although various embodiments of the disclosed apparatus and method have been shown and described, modifications may occur to those skilled in the art upon reading the specification. The present application includes such modifications and is limited only by the scope of the claims.

What is claimed is:

1. A method for manufacturing a structure, said method comprising:
supporting said structure using a post of each one of a plurality of mobile fixtures such that said structure is oriented in a desired orientation about an X-axis, a Y-axis, and a Z-axis, wherein each mobile fixture of said plurality of mobile fixtures is independently movable along said X-axis, said Y-axis and said Z-axis relative to another mobile fixture of said plurality of mobile fixtures;
controlling a position of said structure along said X-axis and said Y-axis by coordinating independent movement of said plurality of mobile fixtures along said X-axis and said Y-axis;
adjusting an orientation of said post of at least one mobile fixture of the said plurality of mobile fixtures relative to said structure by freely rotating said at least one mobile fixture of said plurality of mobile fixtures, at a connector coupled to said post and to said structure, about at least one of said X-axis and said Y-axis relative to said structure while said plurality of mobile fixtures move along said X-axis and said Y-axis such that said desired orientation of said structure is maintained and that induced stresses upon said structure are relieved in response to a force acting upon said connector due to a mismatch in parallelism between said post of said at least one mobile fixture and said post of at least another one mobile fixture of said plurality of mobile fixtures; and
performing an operation on said structure.

2. The method of claim 1 wherein said desired orientation of said structure is maintained by allowing said post of each mobile fixture of said plurality of mobile fixtures to freely rotate, at said connector, about said X-axis and said Y-axis relative to said structure.

3. The method of claim 1 further comprising selectively fixing said structure along said X-axis, said Y-axis and said Z-axis before said performing said operation on said structure.

4. The method of claim 1 further comprising freely rotating said at least one mobile fixture, at said connector, about said X-axis and said Y-axis relative to said structure in response to said force acting upon said connector of said at least one mobile fixture by said structure as said at least one mobile fixture moves along at least one of said X-axis and said Y-axis.

5. The method of claim 1 wherein said mismatch in parallelism is created by a linear variation between said post of said at least one mobile fixture and said post of said at least another one mobile fixture of said plurality of mobile fixtures.

6. The method of claim 1 wherein said mismatch in parallelism is created by an angular variation between said post of said at least one mobile fixture and said post of said at least another one mobile fixture of said plurality of mobile fixtures.

7. A method for transporting a structure, said method comprising:
supporting said structure using a post of each one of a plurality of mobile fixtures such that said structure is oriented in a desired orientation about an X-axis, a Y-axis, and a Z-axis, wherein each one of said plurality of mobile fixtures is independently movable along said X-axis, said Y-axis and said Z-axis relative to another one of the plurality of mobile fixtures;
controlling a position of said structure along said X-axis, said Y-axis, and said Z-axis by coordinating independent movement of each one of said plurality of mobile fixtures along said X-axis, said Y-axis, and said Z-axis; and
adjusting an orientation of said post of at least one mobile fixture of the said plurality of mobile fixtures relative to said structure by freely rotating said at least one mobile fixture of said plurality of mobile fixtures, at a connector coupled to said post and to said structure, about at least one of said X-axis and said Y-axis relative to said structure while said plurality of mobile fixtures move along said X-axis and said Y-axis to react to an external force acting upon said connector of said at least one mobile fixture by said structure due to mismatches in parallelism between said post of said at least one mobile fixture and said post of at least another one mobile fixture of said plurality of mobile fixtures.

8. The method of claim 7 wherein said freely rotating said at least one mobile fixture at said connector relieves stress induced on said structure by at least one of said mobile fixtures.

9. The method of claim 7 wherein said freely rotating said at least one mobile fixture at said connector maintains said structure at said desired orientation about one of said X-axis and said Y-axis.

10. The method of claim 7 wherein said freely rotating said at least one mobile fixture at said connector maintains said structure at said desired orientation about said X-axis and said Y-axis.

11. The method of claim 7 further comprising freely rotating said at least one mobile fixture, at said connector, about said X-axis and said Y-axis relative to said structure.

12. The method of claim 7 wherein said mismatch in parallelism is created by a linear variation between said post of said at least one mobile fixture and said post of said at least another one mobile fixture.

13. The method of claim 7 wherein said mismatch in parallelism is created by an angular variation between said post of said at least one mobile fixture and said post of at least another one mobile fixture.

14. The method of claim 7 wherein:
each one of said mobile fixtures comprises:
a movable base, said post extending from said base along said Z-axis;
a support member coupled to said post, wherein said support member is selectively movable along said Z-axis relative to said post;
said connector of each one of said mobile fixtures comprises:
a connector holder coupled to said support member, wherein said connector holder is selectively movable along said X-axis, along said Y-axis, and about said Z-axis relative to said support member;
a connector body coupled to said connector holder, wherein said connector body is fixed relative to said connector holder;
a first connector member coupled to said connector body, wherein said first connector body is freely rotatable about said X-axis relative to said connector body; and
a second connector member coupled to said first connector member, wherein said second connector member is freely rotatable about said Y-axis relative to said first connector member; and
said supporting said structure using said connector of each one of said plurality of mobile fixtures comprises coupling said second connector member of said connector of each one of said plurality of mobile fixtures to said structure.

15. The method of claim 14 wherein said freely rotating said at least one mobile fixture at said connector comprises freely rotating said first connector member about said X-axis relative to said connector body.

16. The method of claim 14 wherein said freely rotating said at least one mobile fixture at said connector comprises freely rotating said second connector member about said Y-axis relative to said first connector member.

17. The method of claim 14 wherein said freely rotating said at least one mobile fixture at said connector comprises:
freely rotating said first connector member about said X-axis relative to said connector body; and
freely rotating said second connector member about said Y-axis relative to said first connector member.

18. The method of claim 7 wherein said external force is created by at least one of a linear variation and an angular variation between posts of at least two of said plurality of mobile fixtures.

19. The method of claim 7 further comprising selectively fixing said desired orientation of said structure about said Z-axis relative to at least one of said mobile fixtures.

20. The method of claim 7 further comprising selectively fixing said position of said structure along at least one of said X-axis, said Y-axis, and said Z-axis relative to at least one of said plurality of mobile fixtures.

* * * * *